(12) United States Patent
Iwasawa

(10) Patent No.: US 9,285,571 B2
(45) Date of Patent: Mar. 15, 2016

(54) ZOOM LENS AND CAMERA DEVICE INCORPORATING THE SAME

(71) Applicant: Tamron Co., Ltd., Saitama-shi, Saitama (JP)

(72) Inventor: Yoshito Iwasawa, Tokyo (JP)

(73) Assignee: TAMRON CO., LTD., Saitama-shi (JP)

( * ) Notice: Subject to any disclaimer, the term of this patent is extended or adjusted under 35 U.S.C. 154(b) by 0 days.

(21) Appl. No.: 14/409,670

(22) PCT Filed: Jun. 24, 2013

(86) PCT No.: PCT/JP2013/067277
§ 371 (c)(1),
(2) Date: Dec. 19, 2014

(87) PCT Pub. No.: WO2013/191295
PCT Pub. Date: Dec. 27, 2013

(65) Prior Publication Data
US 2015/0338620 A1 Nov. 26, 2015

(30) Foreign Application Priority Data
Jun. 22, 2012 (JP) .................. 2012-141271

(51) Int. Cl.
*G02B 15/14* (2006.01)
*H04N 5/225* (2006.01)

(52) U.S. Cl.
CPC .............. *G02B 15/14* (2013.01); *H04N 5/225* (2013.01)

(58) Field of Classification Search
CPC .................................................... G02B 15/14
See application file for complete search history.

(56) References Cited

U.S. PATENT DOCUMENTS

| 5,666,229 | A | 9/1997 | Ohtake |
| 5,691,851 | A | 11/1997 | Nishio et al. |
| 6,449,433 | B2* | 9/2002 | Hagimori ............. G02B 15/173 348/342 |
| 6,483,648 | B1 | 11/2002 | Yamanashi |
| 8,107,171 | B2* | 1/2012 | Nanba .................... G02B 13/18 359/676 |
| 8,130,451 | B2* | 3/2012 | Saito .................... G02B 15/173 359/676 |

(Continued)

FOREIGN PATENT DOCUMENTS

| JP | 07-077656 A | 3/1995 |
| JP | 08-043734 A | 2/1996 |

(Continued)

OTHER PUBLICATIONS

International Search Report dated Sep. 17, 2013, issued in corresponding application No. PCT/JP2013/067277.
Written Opinion dated Sep. 17, 2013, issued in corresponding application No. PCT/JP2013/067277.

*Primary Examiner* — Thomas K Pham
*Assistant Examiner* — Mitchell Oestreich
(74) *Attorney, Agent, or Firm* — Westerman, Hattori, Daniels & Adrian, LLP

(57) ABSTRACT

Provided are: a zoom lens which exhibits a large variable-power ratio, an increased degree of freedom with respect to aberration correction, and which has been achieved having a sufficient reduction in size in the optical axis direction; and an imaging device equipped therewith. The zoom lens includes at least, from the object side, a first lens group having positive refractive power, a second lens group having negative refractive power, a third lens group having positive refractive power, a fourth lens group, and a fifth lens group, in that order. In the zoom lens, prescribed conditions are satisfied.

9 Claims, 16 Drawing Sheets

(56) References Cited

U.S. PATENT DOCUMENTS

| | | |
|---|---|---|
| 2001/0046383 A1 | 11/2001 | Hagimori et al. |
| 2003/0151828 A1 | 8/2003 | Ozaki |
| 2008/0218875 A1 | 9/2008 | Kuroda et al. |
| 2008/0304167 A1* | 12/2008 | Souma ............... G02B 15/173 359/766 |
| 2011/0176224 A1 | 7/2011 | Sato et al. |
| 2013/0148005 A1 | 6/2013 | Imaoka et al. |

FOREIGN PATENT DOCUMENTS

| | | |
|---|---|---|
| JP | 2001-091833 A | 4/2001 |
| JP | 2001-350093 A | 12/2001 |
| JP | 2003-066334 A | 3/2003 |
| JP | 2006-251462 A | 9/2006 |
| JP | 2010-032700 A | 2/2010 |
| WO | 2012/026088 A1 | 3/2012 |

* cited by examiner

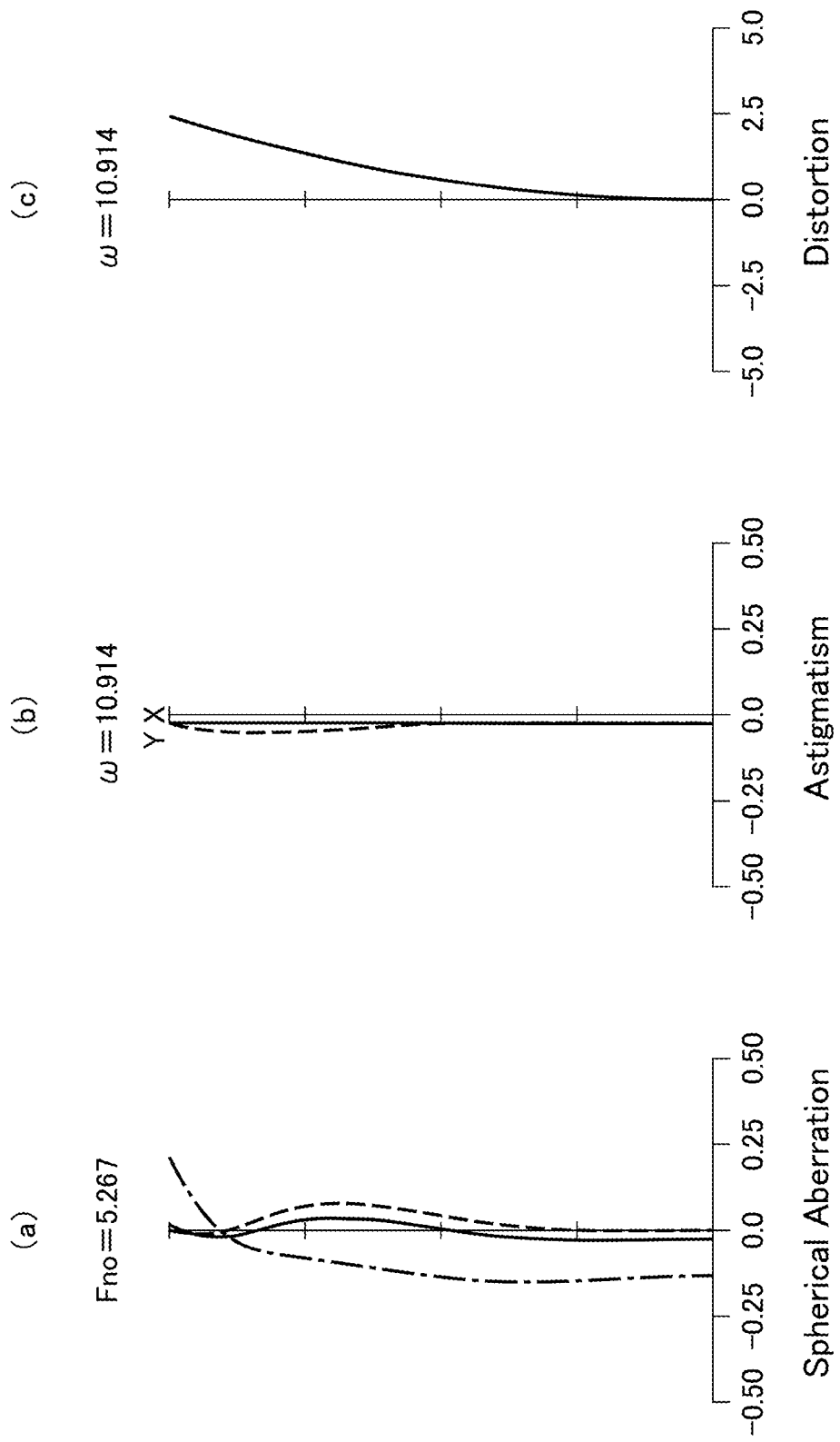

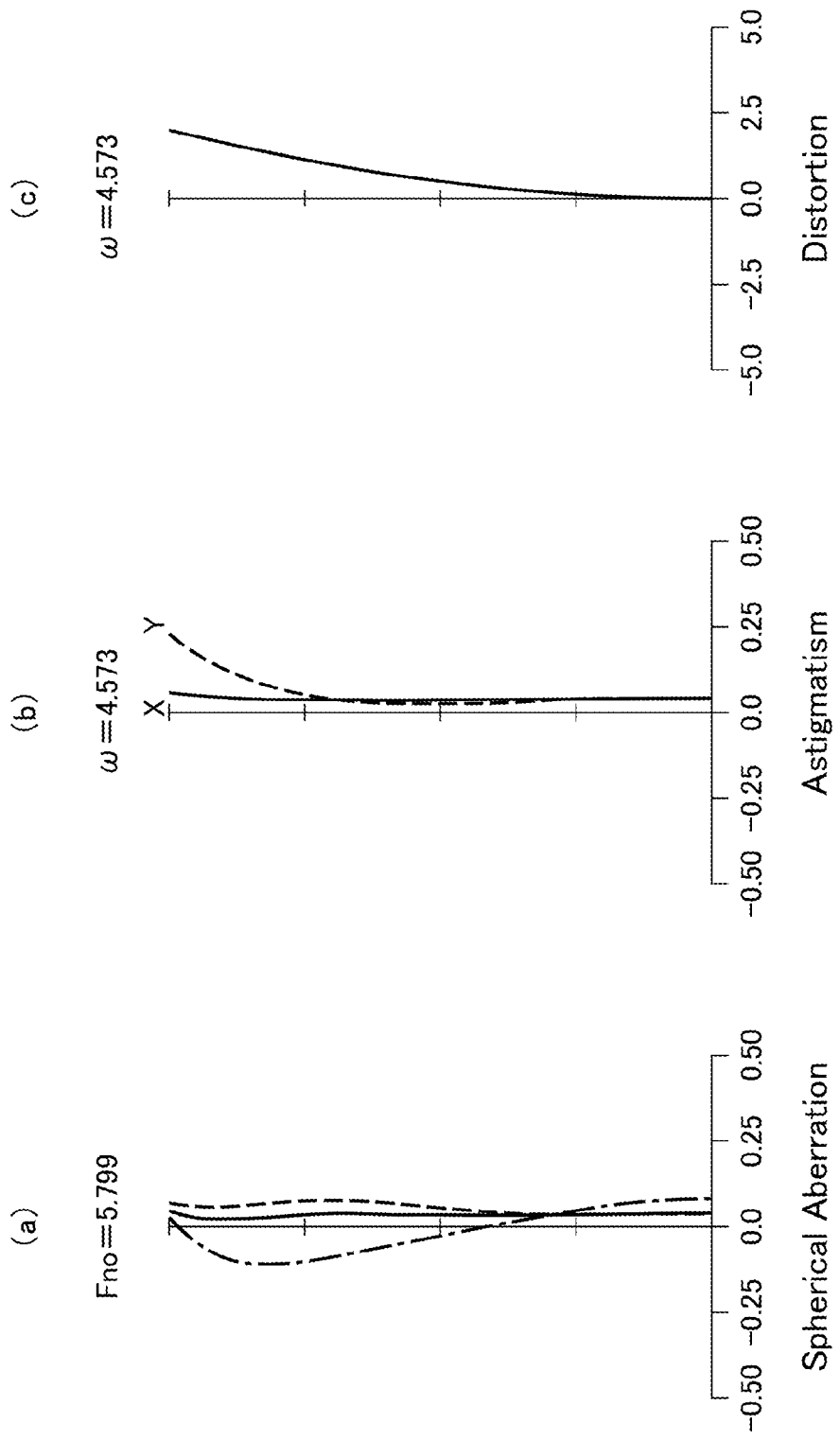

ZOOM LENS AND CAMERA DEVICE INCORPORATING THE SAME

FIELD OF THE INVENTION

The present invention relates to zoom lenses and camera devices incorporating the same, and more particularly, great magnification range, compact, light-weight, and high-speed focusing zoom lenses and camera devices incorporating the same.

BACKGROUND ART

For the recent years, camera devices, such as digital still cameras, employing solid state image sensors have become increasingly popular. In accordance with this, higher performance and miniaturized optics have been developed, which leads to a rapid popularization of much more downsized camera systems.

Evolution of optical systems toward much higher performance accordingly accelerates a demand for optical systems of much higher image quality and a demand for much greater magnification range optical systems, especially, extra great magnification range optical systems of which variable power ratio is greater than ×10. In addition, also strongly desired is downsizing not only of longitudinal extensions of optical systems along the optical axis but also of diameters of lens barrels; that is, optical systems satisfying all the needs and wants simultaneously are desired.

Prior art zoom lenses satisfying, to some extent, the needs and wants of higher image quality greater magnification range, and downsizing, include a compact zoom lens that provides the maximal angle of view exceeding 70 degrees and a variable power ratio of approximately ×10 or even greater, and still yet attains a satisfactory image quality as well as appropriate focusing, which comprises five lens groups, namely, a first lens group G1 of positive refractivity, a second lens group G2 of negative refractivity, a third lens group G3 of positive refractivity, a fourth lens group G4 of negative refractivity, and a fifth lens group G5 of positive refractivity where upon varying its operative posture from the wide angle end to the telephoto end to vary magnification, distances between the first and second lens groups G1, G2 and between the third and fourth lens groups G3, G4 become greater while distances between the second and third lens groups G2, G3 and between the fourth and fifth lens groups G4, G5 become smaller, and the third lens group G3 or part or subset of the lens group are displaced to permit the zoom lens be in infinity focus (e.g., see Patent Document 1 listed below).

Some other zoom lenses satisfying the aforementioned needs and wants to some extent include that which provides variable power ratio as great as ×7 to ×10, F number as great as 2.5 to 4, and sufficiently high performance to serve as an optical system suitable for the up-to-date image pick-up devices with the smallest pixel pitch, which is designed as a very compact high variable power zoom lens system and comprises the foremost or first lens group (Gr1) of positive refractive power, the succeeding or second lens group (Gr2) of negative refractive power, the third lens group (Gr3) of positive refractive power, and the rearmost or fourth lens group (Gr4) of negative refractive power arranged in a series, meeting the requirements defined in the formula as follows:

$$1.1 < f1/fT < 2.5$$

where f1 is a focal length of the first lens group (Gr1), and fT is a focal length of the whole optical system of the zoom lens photographing at its telephoto end (T) (e.g., see Patent Document 2 listed below).

Further other zoom lenses satisfying the aforementioned needs and wants to some extent include a zoom lens system that is sufficiently compact to incorporate in video cameras, digital still cameras, lens-integrated cameras, and the like, optimized for high-speed auto-focusing, and of enhanced image quality, which comprises the foremost or first positive power lens group, the succeeding or second negative power lens group, the third positive power lens group, the fourth negative power lens group, the fifth positive power lens group, and the rearmost or sixth negative power lens group arranged in a series where distances between the adjacent pairs of the lens groups are varied to vary power, meeting the requirements defined in the formulae as follows:

$$DW(1\text{-}2) < DT(1\text{-}2) \tag{1}$$

$$DW(2\text{-}3) > DT(2\text{-}3) \tag{2}$$

$$DW(3\text{-}4) > DT(3\text{-}4) \tag{3}$$

$$DW(4\text{-}5) < DT(4\text{-}5) \tag{4}$$

$$DW(5\text{-}6) < DT(5\text{-}6) \tag{5}$$

where $DW(i\text{-}j)$ is a distance between the i-th and j-th lens groups when the zoom lens system photographing at its wide-angle end is in infinity focus. $DT(i\text{-}j)$ is a distance between the i-th and j-th lens groups when the zoom lens system at its telephoto end is in infinity focus; and the fourth lens groups being displaced along the optical axis for focusing (e.g., see Patent Document 3 listed below).

LIST OF THE DOCUMENTS OF THE RELATED ART

Patent Documents 1 to 3

1. JPN Pat. Preliminary Publication of Unexamined Pat. Appl. No. 2001-091833
2. JPN Pat. Preliminary Publication of Unexamined Pat. Appl. No. 2001-350093
3. JPN Pat. Preliminary Publication of Unexamined Pat. Appl. No. 2006-251462

SUMMARY OF THE INVENTION

Problems to be Solved by the Invention

The aforementioned prior art zoom lenses have their lens groups for zooming increased in number to enhance the freedom of compensating for aberrations, thereby enhancing the image quality throughout the zooming range. As to the zoom lens system disclosed in Patent Document 1, however, providing the variable power ratio as much as ×10, it is not satisfactorily reduced in dimension along the optical axis.

Meanwhile, as to the zoom lenses disclosed in Patent Documents 2 and 3, successfully attaining the enhanced image quality by virtue of the displaceable lens groups increased in number, they provide a variable power ratio so unsatisfactorily small as to meet the demand for greater magnification range. They are also insufficient in reducing the dimension along the optical axis.

Object of the Invention

The present invention is made to overcome the aforementioned disadvantages in the prior art zoom lenses, and accordingly, it is an object of the present invention to provide a zoom lens attaining an enhanced variable power ratio, increased freedom of compensating for aberrations, and satisfactory downsizing along the optical axis, and also provide a camera device incorporating the same.

Solutions to the Problems with the Prior Art

<1st Aspect of the Invention>

In one aspect of the present invention, provided is a zoom lens comprising at least five lens groups, namely, the first lens group of positive refractive power, the second lens group of negative refractive power, the third lens group of positive refractive power, the fourth lens group, and the fifth lens group serially arranged in order on the closest to an object first basis, meeting the requirements defined in the formulae as follows:

$$2.0<\beta rt<3.5 \quad (1)$$

$$-0.8<frt/ft<-0.3 \quad (2)$$

where $\beta rt$ is a composite lateral magnification of the lens groups behind the third lens group and closer to the image plane than the same while the zoom lens takes an operative posture at its telephoto end. frt is a composite focal length of the lens groups behind the third lens group and closer to the image plane while the zoom lens takes an operative posture at its telephoto end, and ft is a focal length of the zoom lens at the telephoto end.

In the first aspect of the present invention, it is especially preferable that there are five or more lens groups, namely, the first positive power lens group, the second negative power lens group, the third positive power lens group, and the fourth and fifth lens groups, and distances between the adjacent pairs of the lens groups and distances between convergence positions of rays from the adjacent pairs of the lens groups are varied during the zooming.

<Effect of the Invention in the 1st Aspect>

The first aspect of the present invention permits a zoom lens design that successfully attains an enhanced variable power ratio, increased freedom of compensating for aberrations, and sufficient downsizing along the optical axis.

Especially, the zoom lens thus designed to have five or more lens groups such as the first positive power lens group, the second negative power lens group, the third positive power lens group, the fourth and fifth lens groups, and/or the like can have distances between the adjacent pairs of the five or more lens groups and distances between convergence positions of rays from the adjacent pairs of the same respectively varied to enhance the freedom of compensating for aberrations.

The effect of the invention in the first aspect will now be compared with those of the inventions disclosed in the aforementioned prior art patent documents. A telephoto ratio of the zoom lens taking an operative posture at the telephoto end, namely, a ratio of the overall length to the focal length of the zoom lens is 1.12 in Embodiment 1 of the present invention in the first aspect and the smallest of all, i.e., 1.87 in the second embodiment of the invention in Patent Document 1. 2.36 in the fourth embodiment of the invention in Patent Document 2, and 1.24 in the sixth embodiment of the invention in Patent Document 3.

It will be appreciated from this that the present invention in the first aspect is beneficial in downsizing the overall length of the zoom lens upon photographing at the telephoto end.

<2nd Aspect of the Invention>

According to the second aspect of the present invention, provided is a camera device that incorporates image pick-up devices in position closer to the image plane of the zoom lens in the first aspect of the present invention for receiving an optical image produced by the zoom lens and converting it into electric signals.

<Effect of the Invention in the 2nd Aspect>

The second aspect of the present invention permits a zoom lens design that exploits the features of the aforementioned zoom lenses in the first and second aspects of the present invention to attain a more compact, more light-weight, higher-speed focusing zoom lens and provide a camera device incorporating such a zoom lens.

EMBODIMENT 1 OF THE INVENTION

In the context of the present invention in the first aspect, the second lens group meets the requirements defined in the formula as follows:

$$3.5<\beta 2t/\beta 2w<8.0 \quad (3)$$

where $\beta 2t$ is a lateral magnification of the second lens group in the zoom lens focusing telephoto, and $\beta 2w$ is a lateral magnification of the second lens group in the zoom lens focusing wide angle.

EMBODIMENT 2 OF THE INVENTION

In the context of the present invention in the first aspect, upon shifting its operative posture from the wide-angle end to the telephoto end to vary magnification, the zoom lens focusing wide angle has its first lens group displaced closer to an object to photograph than it is focusing telephoto.

EMBODIMENT 3 OF THE INVENTION

In the context of the present invention in the first aspect, the fourth lens group exhibits negative refractive power.

EMBODIMENT 4 OF THE INVENTION

In the context of the present invention in the first aspect, the fourth lens group is displaced toward the image plane for shifting the zoom lens from a state of being in infinity focus to another state of being in focus on an object within (lose-up photographing range.

EMBODIMENT 5 OF THE INVENTION

In the context of the present invention in the first aspect, the lens groups behind the third lens group and closer to the image plane than the same meet the requirements defined in the formula as follows:

$$2.2<frw/f2<3.4 \quad (4)$$

where frw is a composite focal length of the lens groups behind the third lens group and closer to the image plane, and f2 is a focal length of the second lens group.

EMBODIMENT 6 OF THE INVENTION

In the context of the present invention in the first aspect, the fifth lens group exhibits negative refractive power.

EMBODIMENT 7 OF THE INVENTION

In the context of the present invention in the first aspect, the sixth lens group of positive refractive power is disposed immediately behind the fifth lens group and closer to the image plane.

<Description of the Formula (1)>

Meeting the requirements defined in the formula (1), the zoom lens can ensure an appropriate back focal distance or back focus upon taking an operative posture at the telephoto end.

When βrt is smaller than the lower limit defined in the formula (1), a lateral magnification of the lens groups closer to the image plane becomes smaller, which leads to insufficient downsizing of the diameter of the zoom lens.

When βrt exceeds the upper limit defined in the formula (1), a magnification rate derived from the lens groups closer to the image plane becomes so great as it is needed to have a greater number of lens pieces dedicated to the compensation for aberrations, which will hinder the downsizing in a longitudinal dimension.

<Description of the Formula (2)>

When frt/ft is smaller than the lower limit defined in the formula (2), a composite focal length of the lens groups closer to the image plane becomes greater, or in other words, the back focus considering telephoto ratio becomes greater, which results in an increase in the overall length of the zoom lens upon focusing telephoto.

When frt/ft exceeds the upper limit defined in the formula (2), the composite focal distance of the lens groups closer to the image plane becomes excessively small, or in other words, the back focus considering telephoto ratio becomes excessively small. Resultantly, it is needed to have an increased number of lens pieces dedicated to the compensation for aberrations, which will hinder the downsizing in a longitudinal dimension.

<Description of the Formula (3)>

When β2t/β2w is smaller than the lower limit defined in the formula (3), the second lens group contributes less to variation in magnification, and this makes it difficult to enhance variable power ratio of the zoom lens as a whole.

When β2t/β2w exceeds the upper limit defined in the formula (3), the second lens group causes excessive variation in magnification, and it is unavoidable to have an increased number of lens pieces, which will hinder the downsizing in a longitudinal dimension.

<Description of the Formula (4)>

Correction of distortion aberration developed in the zoom lens upon focusing wide angle is facilitated by appropriately adjusting the ratio of a composite focal distance of the lens groups behind the third lens group and closer to the imaging plane to a focal distance of the second lens group. As the second lens group comes to predominant in power, the second lens group permits stronger negative distortion to occur. Thus, it is desirable to achieve an optical power balance in which the lens groups closer to the imaging plane develop positive distortion to facilitate cancellation of the negative distortion.

When frw/f2 is smaller than the lower limit defined in the formula (4), specifically, when the lens groups closer to the image plane come to excessively predominant in power, the compensation for curvature of field is difficult.

When frw/f2 exceeds the upper limit defined in the formula (4), specifically, when the lens groups closer to the image plane are inferior in power, these lens groups fail to develop sufficient positive distortion, and this hinders the whole lens system from cancelling the negative distortion.

BRIEF DESCRIPTION OF THE DRAWINGS

FIG. 15 depicts graphs of spherical aberration, astigmatism, and distortion developed in the fourth embodiment of the zoom lens extended to the intermediate focal distance and in infinity focus; and FIG. 16 depicts graphs of spherical aberration, astigmatism, and distortion developed in the fourth embodiment of the zoom lens extended up to the telephotographing focal distance and in infinity focus.

BEST MODE OF THE INVENTION

In conjunction with the following description of embodiments of the present invention, various optical data of parameters are used: that is, surface number NS denotes the n-th surfaces of individual lens pieces in a series counted on the closest to an object first basis, R denotes a radius of curvature of each of the surfaces of the lens pieces. D is a distance along the optical axis between any of the adjacent pairs of the surfaces of the lens pieces, Nd denotes a refractive index for the d-line (wavelength Δ=587.6 nm), and vd is an Abbe number for the d-line (wavelength λ=587.6 nm). In addition, the surface number succeeded by STOP designates an aperture stop. The surface number succeeded by ASPH indicates an aspherical surface of which radius of curvature R in the optical parameter table is a paraxial curvature radius.

EMBODIMENT 1

Figure 1:
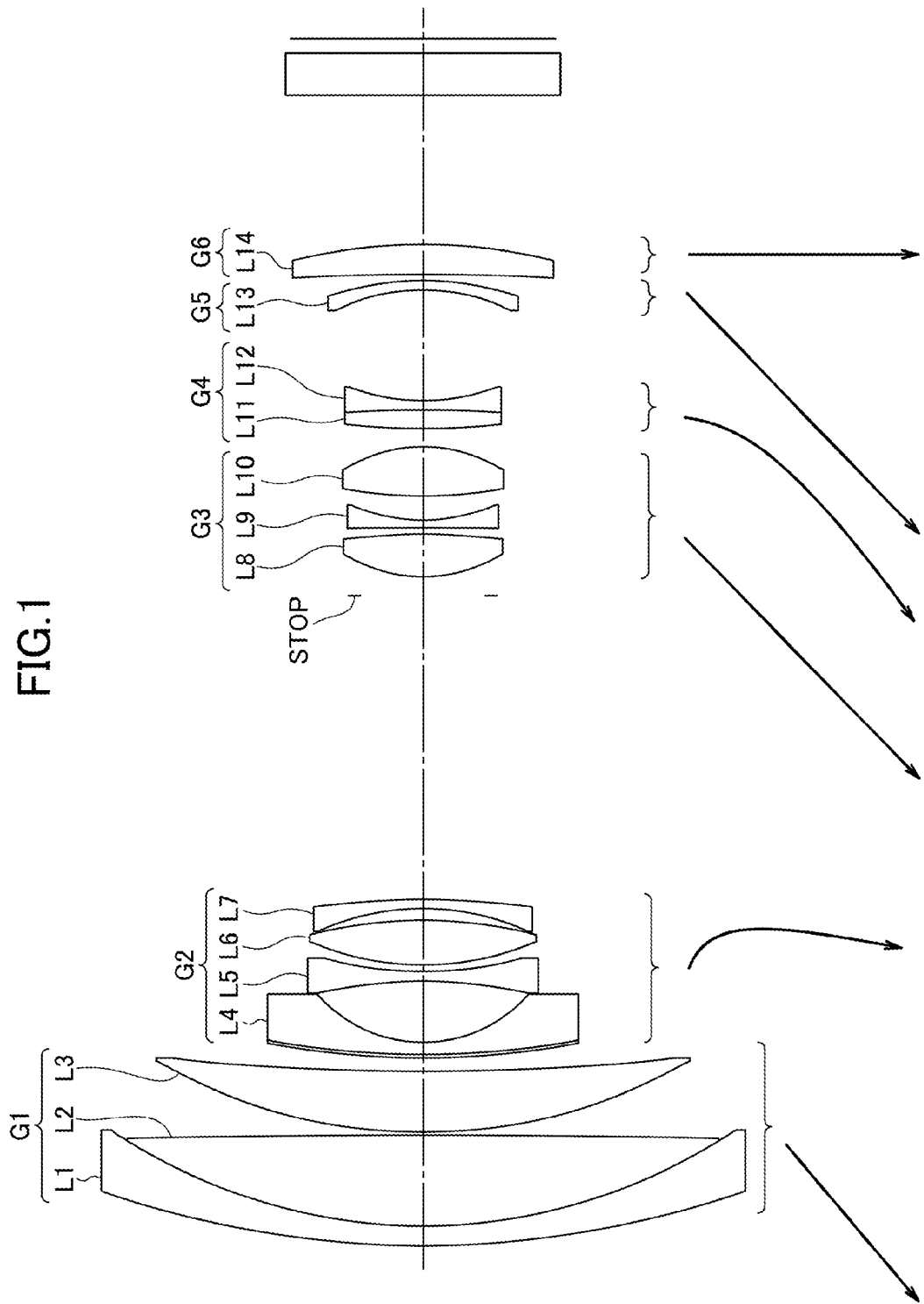
FIG. 1 is a vertical cross sectional view illustrating lens optics in a first embodiment of a zoom lens according to the present invention, with the zoom lens taking an operative posture at the wide-angle end.
Figure 2:
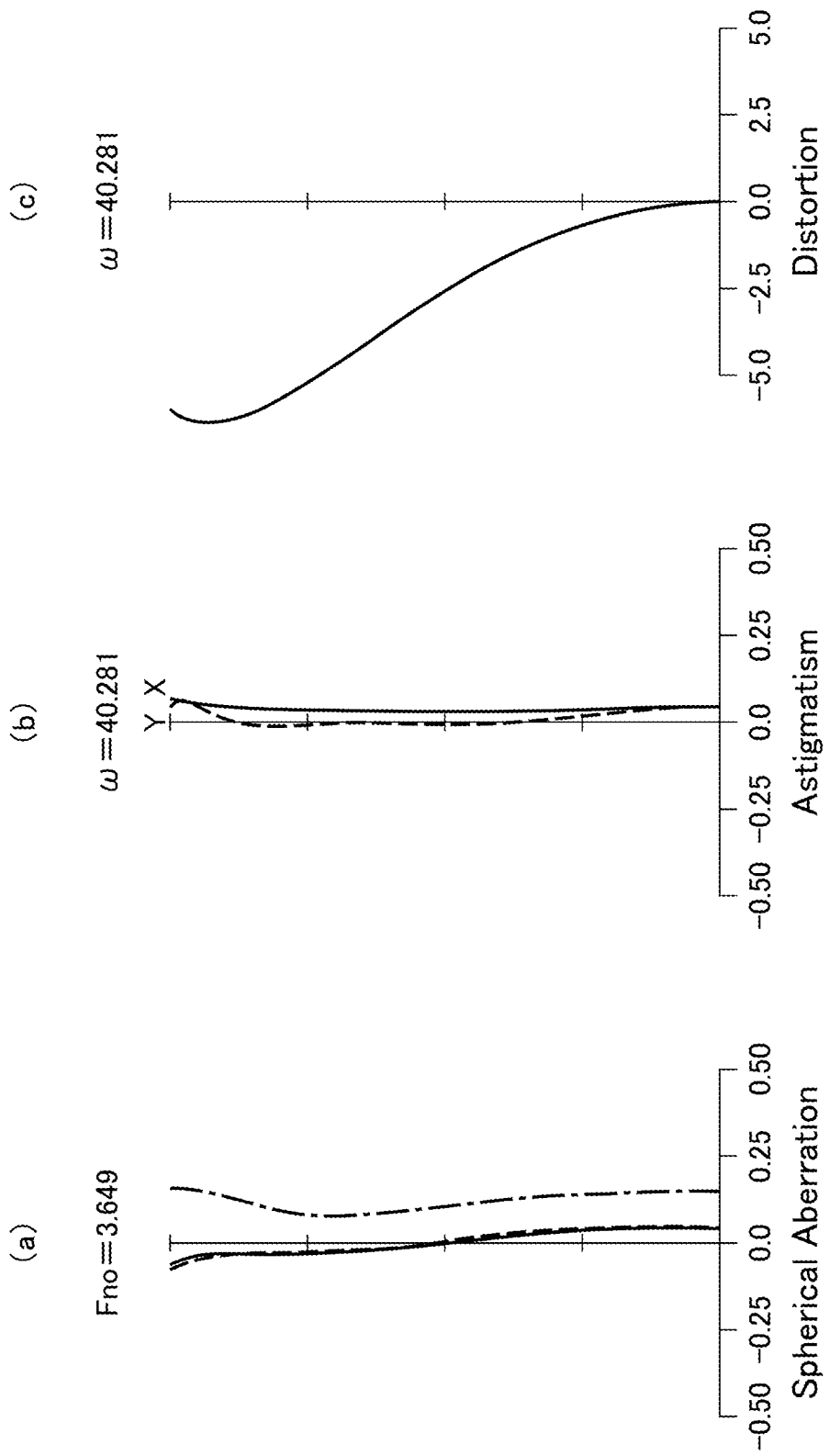
FIG. 2 depicts graphs of spherical aberration, astigmatism, and distortion developed in the first embodiment of the zoom lens photographing at the wide-angle end and in infinity focus where the graph of spherical aberration includes broken line for the g-line (435.8 nm in wavelength) and alternate dash and dot line for the C-line (656.3 nm) while the graph of astigmatism includes solid line for sagittal image plane and broken line for meridional image plane, and all the graphs of the aberrations in the succeeding drawings follow the style.
Figure 3:
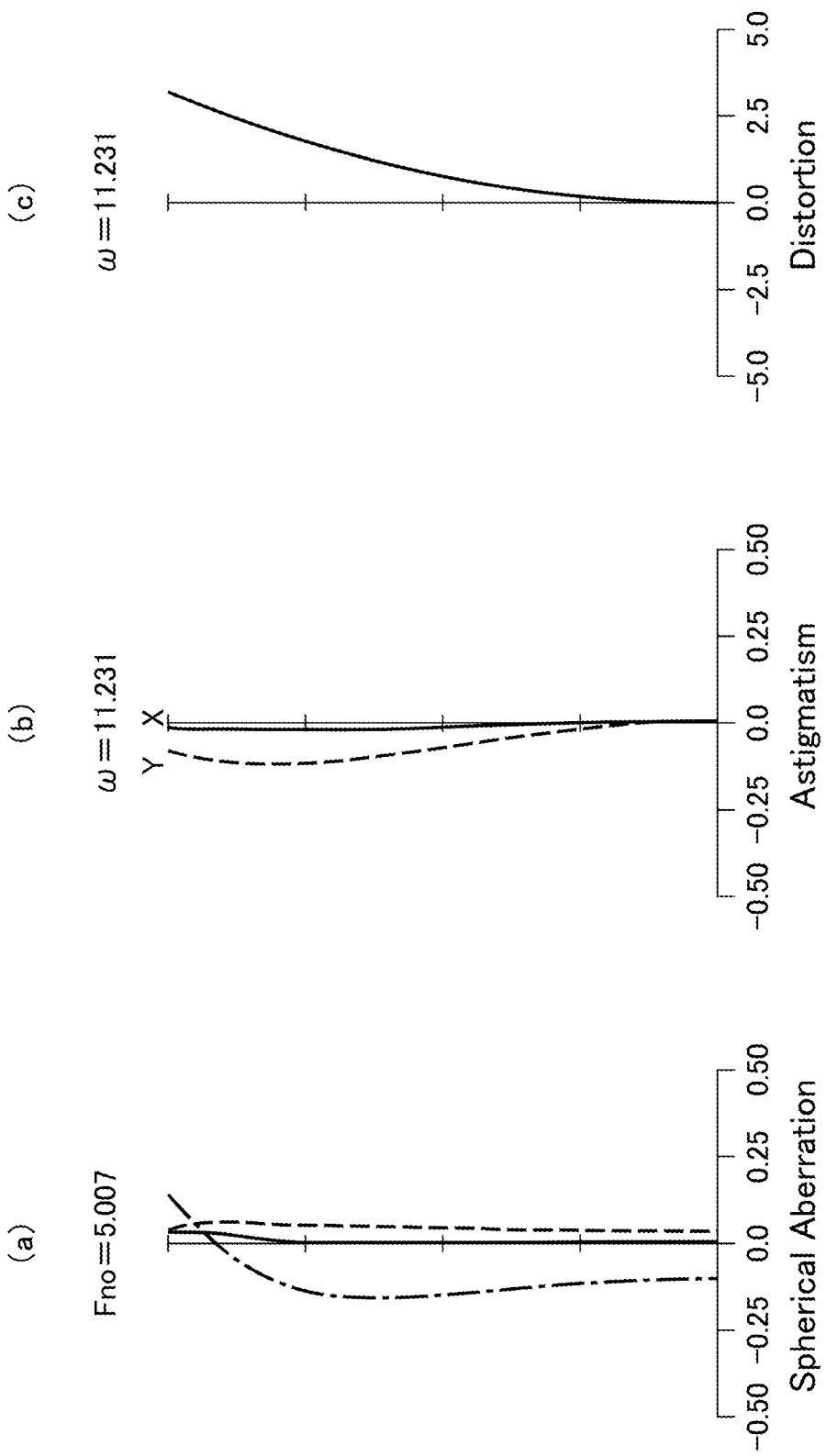
FIG. 3 depicts graphs of spherical aberration, astigmatism, and distortion developed in the first embodiment of the zoom lens extended to the intermediate focal distance and in infinity focus.
Figure 4:
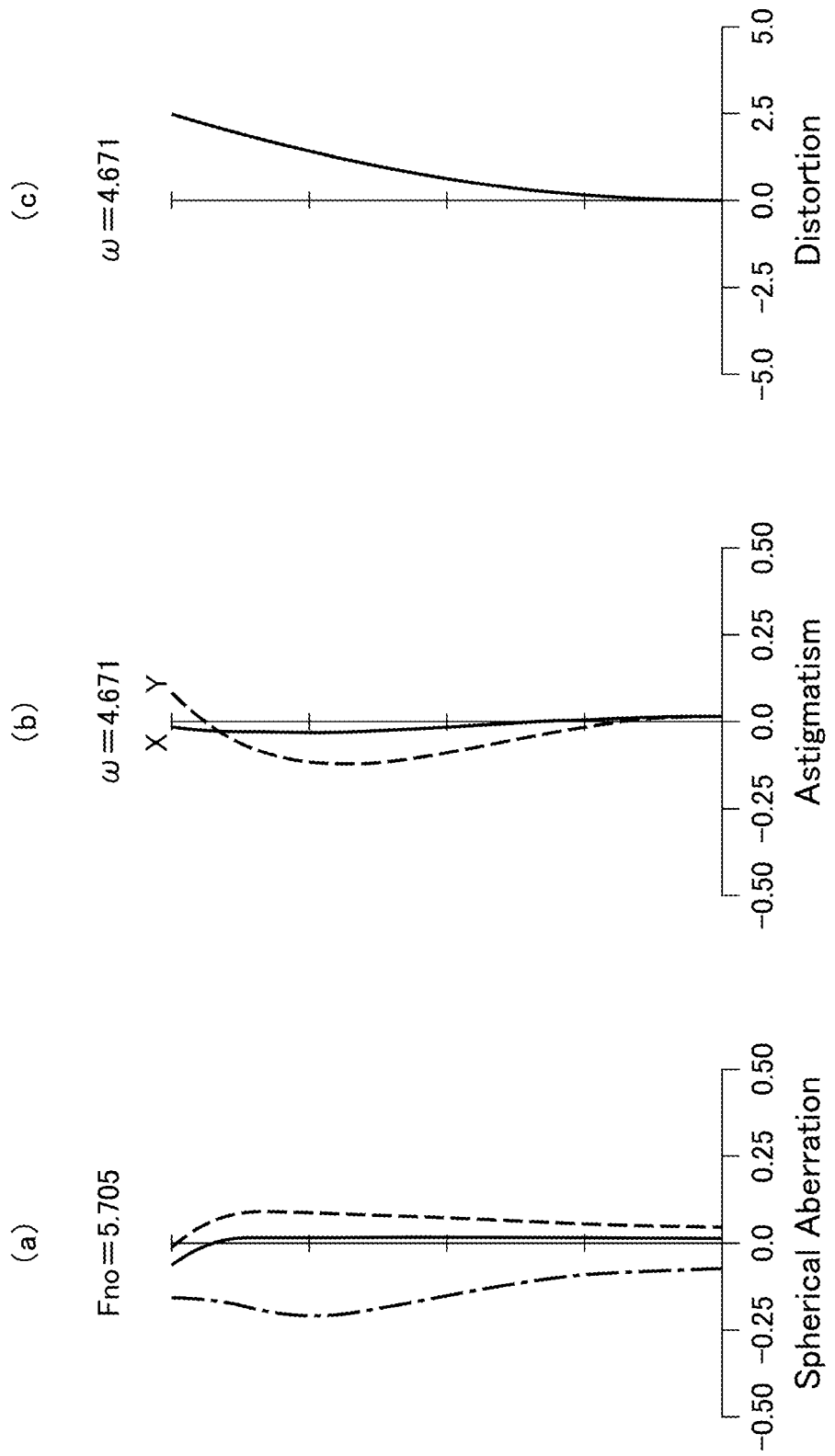
FIG. 4 depicts graphs of spherical aberration, astigmatism, and distortion developed in the first embodiment of the zoom lens extended up to the telephotographing focal distance and in infinity focus.

A first embodiment of the zoom lens according to the present invention comprises, as shown in FIG. 1, the first lens group G1 of positive refractive power, the second lens group G2 of negative refractive power, the third lens group G3 of positive refractive power, the fourth lens group G4 of negative refractive power, the fifth lens group G5 of negative refractive power, and the sixth lens group G6 of positive refractive power serially arranged in order on the closest to an object first basis.

The first lens group G1 is comprised of a cemented lens of two lens pieces, namely, a negative power meniscus lens piece L1 the closest to the object and having its convex surface faced toward the object and a positive power lens piece L2, and a positive power meniscus lens piece L3 farther from the object and having its convex surface faced toward the object.

The second lens group G2 is comprised of a negative power meniscus lens piece L4 the closest to the object and having its front side shaped in aspherical surface and its rear side shaped in intensely in-curved concave surface, a lens piece L5 the second closest to the object and having its opposite sides shaped in concave surface, a lens piece L6 having its opposite sides shaped in convex surfaces, and a negative power meniscus lens piece L7 the farthest from the object and having its concave surface faced toward the object.

The third lens group G3 is comprised of a lens piece L8 the closest to the object and having its opposite sides shaped in aspherical convex surface, a lens piece L9 having its opposite sides shaped in concave surface, and a lens piece L10 the farthest from the object and having its opposite sides shaped in convex surface.

The fourth lens group G4 is comprised of a cemented lens of two lens pieces, namely, a lens piece L14 closer to the object and having its opposite sides shaped in convex surface and a lens piece L11 having its aspherical surface faced toward the image plane and its front and rear sides shaped in concave surface.

The fifth lens group G5 is comprised of a negative power meniscus lens piece L12 having its concave surface faced toward the image plane.

The sixth lens group G6 is comprised of a positive power meniscus lens piece 113 having its convex surface faced toward the image plane.

The zoom lens in the first embodiment, upon varying its operative posture from the wide angle end to the telephoto end to vary magnification, has its first lens group displaced toward the object, its second lens group traversed along the trajectory first coming closer to and then apart from the image plane, its third lens group displaced toward the object, its fourth lens group traversed relative to the third lens group along the trajectory first coming closer to and then apart from the image plane, its fifth lens group displaced toward the object, and its sixth lens group kept stationary relative to the image plane.

Focusing on an object within close-up photographing range is conducted by displacing the fourth lens group toward the image plane.

The optical data of parameters on the zoom lens in the first embodiment are given as follows:

TABLE 1

| NS | R | D | Nd | vd |
|---|---|---|---|---|
| 1 | 63.6829 | 1.3000 | 1.91048 | 31.31 |
| 2 | 36.5043 | 0.0100 | 1.57046 | 42.84 |
| 3 | 36.5043 | 5.9600 | 1.49845 | 81.61 |
| 4 | −852.9715 | 0.2000 | | |
| 5 | 34.2606 | 4.0000 | 1.62032 | 63.39 |
| 6 | 151.8569 | D(6) | | |
| 7 ASPH | 54.3406 | 0.2000 | 1.51700 | 49.96 |
| 8 | 54.6285 | 0.8000 | 1.91695 | 35.25 |
| 9 | 8.9090 | 4.0317 | | |
| 10 | −30.8661 | 0.6500 | 1.91695 | 35.25 |
| 11 | 23.5188 | 0.4000 | | |
| 12 | 17.7113 | 2.9807 | 1.93323 | 20.88 |
| 13 | −28.4855 | 0.7683 | | |
| 14 | −16.2247 | 0.6000 | 1.77621 | 49.62 |
| 15 | −51.4542 | D(15) | | |
| 16 STOP | 0.0000 | 1.2000 | | |
| 17 ASPH | 9.1792 | 2.8596 | 1.58547 | 59.46 |
| 18 ASPH | −21.2748 | 0.3952 | | |
| 19 | −469.2779 | 0.5000 | 1.89461 | 30.74 |
| 20 | 11.3473 | 1.6070 | | |
| 21 | 27.4927 | 3.2402 | 1.59489 | 68.62 |
| 22 | −9.5668 | D(22) | | |
| 23 | 48.0920 | 1.2000 | 1.81263 | 25.46 |
| 24 | −93.4000 | 0.0100 | 1.57046 | 42.84 |
| 25 | −93.4000 | 0.6000 | 1.80558 | 45.45 |
| 26 ASPH | 13.0486 | D(26) | | |
| 27 | −12.9322 | 0.6300 | 1.81263 | 25.46 |
| 28 | −18.8160 | D(28) | | |
| 29 | −147.0832 | 1.9501 | 1.73234 | 54.67 |
| 30 | −35.3238 | 9.8000 | | |
| 31 | 0.0000 | 2.8000 | 1.51872 | 64.20 |

In the above table of the optical data of parameters, any of aspherical surfaces identified by their respective surface numbers succeeded by ASPH can be expressed by the following equation:

$$X(y)=(y^2/R)/[1+(1-\epsilon \cdot y^2/R^2)^{1/2}]+A4 \cdot y^4+A6 \cdot y^6+A8 \cdot y^8+A10 \cdot y^{10}$$

where X(y) is a distance (or a sagittal) from the apex of the aspherical surface to the center of the base of the asphere along the optical axis relative to the height y perpendicular to the optical axis, R is a radius of curvature (or a paraxial curvature radius) of the reference spherical surface, is a constant of the cone, and A4, A6, A8 and A10 are constants of the aspherical surfaces.

The optical data of parameters on the aspherical surfaces are given as follows:

TABLE 2

| ASPH | ε | A4 | A6 | A8 | A10 |
|---|---|---|---|---|---|
| 7 | 1.0000 | 1.91163e-005 | -4.04139e-007 | 3.49343e-009 | -1.49337e-011 |
| 17 | 1.0000 | -1.14585e-004 | 4.99824e-006 | -1.46840e-007 | -1.08200e-009 |
| 18 | 1.0000 | 4.60442e-004 | 5.38067e-006 | -2.32614e-007 | 0.00000e+000 |
| 26 | 1.0000 | -6.79774e-006 | -5.35988e-008 | 4.43501e-009 | -9.66065e-011 |

Further given below is a varied distance between the specified adjacent pair of the surfaces of the lens pieces during the zooming in its various stages, that is, with the zoom lens staying at the wide-angle end (f=10.30 mm) being extended to the intermediate focal distance (f=30.47 mm) and up to the telephoto end (f=97.97 mm), and vice versa, together with a focal distance f (in millimeters), F number Fno, and an angle of field ω.

TABLE 3

| f | 10.30 | 30.47 | 97.97 |
|---|---|---|---|
| Fno | 3.6490 | 5.0069 | 5.7049 |
| ω | 40.281 | 11.231 | 4.671 |
| D(6) | 0.9300 | 15.4076 | 32.7201 |
| D(15) | 20.1523 | 7.8284 | 1.9719 |
| D(22) | 1.2330 | 2.6313 | 1.5000 |
| D(26) | 7.2929 | 5.8946 | 7.0259 |
| D(28) | 0.4190 | 11.1985 | 17.2290 |

Still further given below is a varied distance between the surfaces of the lens pieces from a state where the zoom lens in focus on an object within close-up photographing range stays at the wide-angle end (f=10.30 mm) to another state of its being extended to the intermediate focal length (f=30.47 mm) and up to the telephoto end (f=97.97 mm), together with a focal length f (in millimeters) of the zoom lens in infinity focus and a distance D(0) (in millimeters) from the object to photograph to the foremost or first lens surface:

| f | 10.30 | 30.47 | 97.97 |
|---|---|---|---|
| D(0) | 920.28 | 903.19 | 889.86 |
| D(22) | 1.2704 | 3.3008 | 2.9038 |
| D(26) | 7.2555 | 5.2251 | 5.6221 |

EMBODIMENT 2

Figure 5:
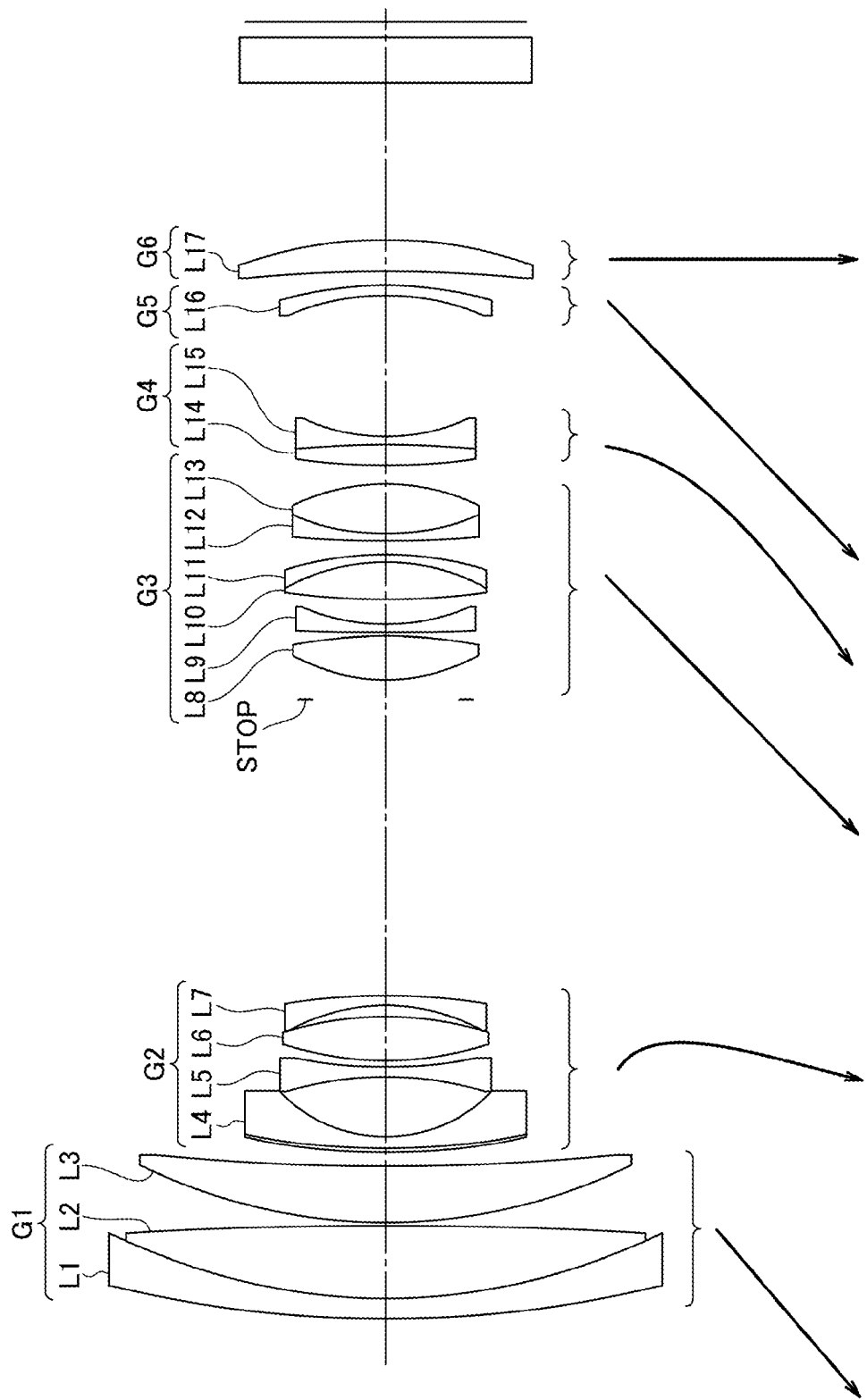
FIG. 5 is a vertical cross-sectional view illustrating a second embodiment of the zoom lens according to the present invention, with the zoom lens taking an operative posture at the wide-angle end.
Figure 6:
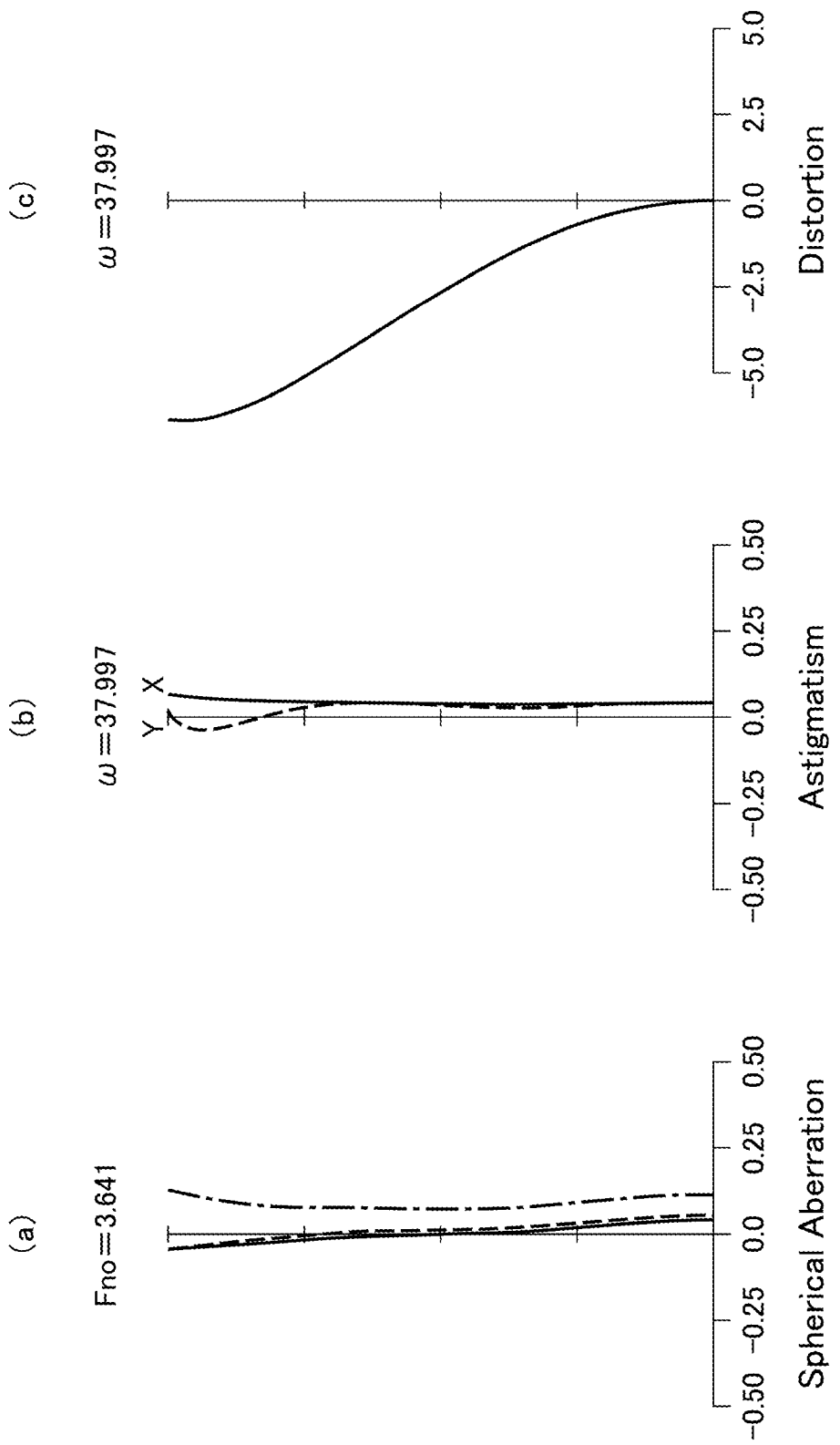
FIG. 6 depicts graphs of spherical aberration, astigmatism, and distortion developed in the second embodiment of the zoom lens photographing at the wide-angle end and in infinity focus.
Figure 7:
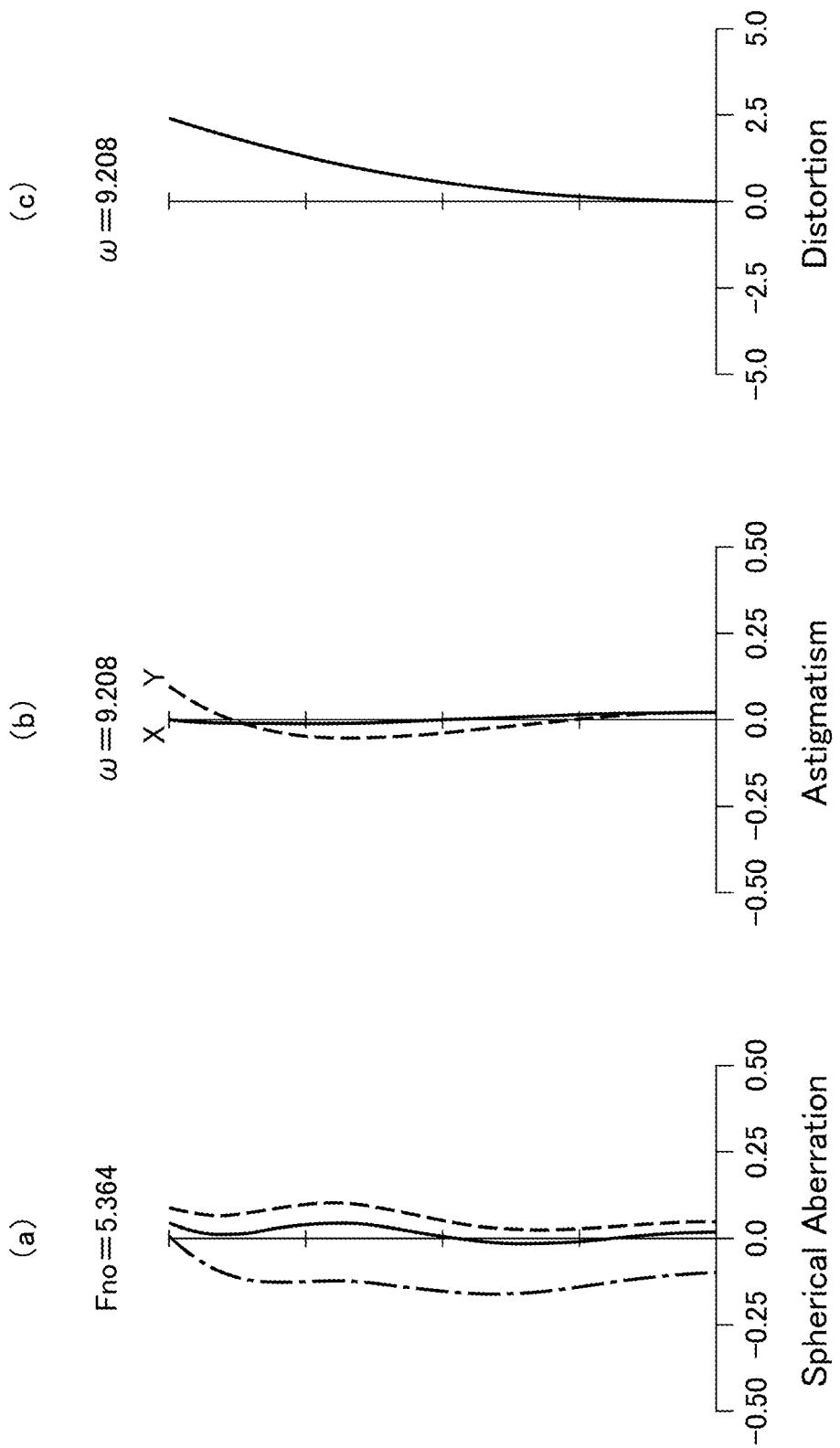
FIG. 7 depicts graphs of spherical aberration, astigmatism, and distortion developed in the second embodiment of the zoom lens extended to the intermediate focal distance and in infinity focus.
Figure 8:
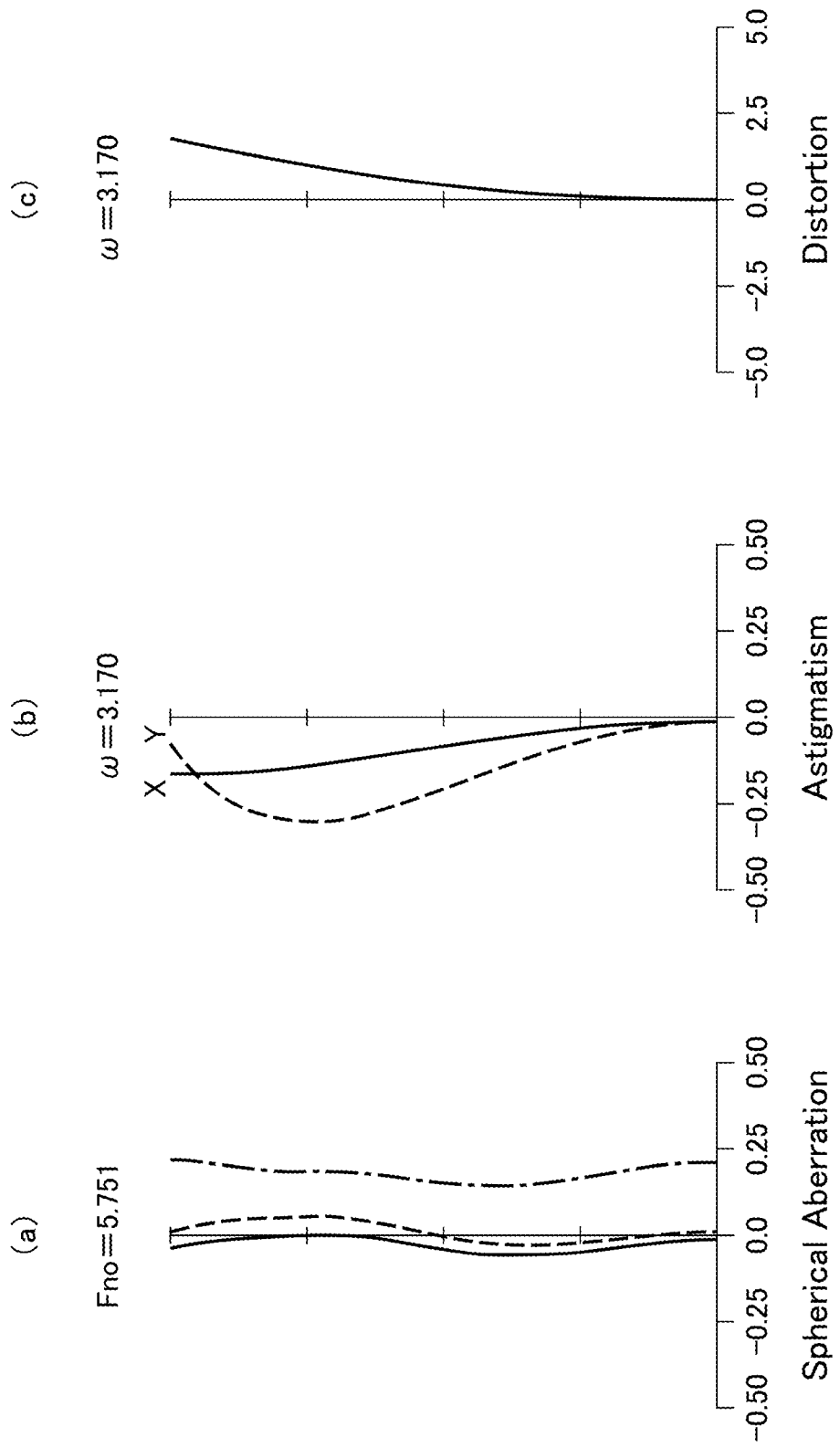
FIG. 8 depicts graphs of spherical aberration, astigmatism, and distortion developed in the second embodiment of the zoom lens extended up to the telephotographing focal distance and in infinity focus.

A second embodiment of the zoom lens comprises, as shown in FIG. 5, the first lens group G1 of positive refractive power, the second lens group G2 of negative refractive power, the third lens group G3 of positive refractive power, the fourth lens group G4 of negative refractive power, the fifth lens group G5 of negative refractive power, and the sixth lens group G6 of positive refractive power serially arranged in order on the closest to an object first basis.

The first lens group G1 is comprised of a cemented lens of two lens pieces, namely, a negative power meniscus lens piece L1 the closest to the object and having its convex surface faced toward the object and a positive power lens piece L2, and a positive power meniscus lens piece L3 having its convex surface faced toward the object.

The second lens group G2 is comprised of a negative power meniscus lens piece L4 the closest to the object and having its aspherical surface faced toward the object and its rear side shaped in intensely in-curved concave surface, a lens piece L5 the second closest to the object and having its opposite sides shaped in concave surface, a lens piece L6 having its opposite sides shaped in convex surface, and a negative power meniscus lens piece L7 the farthest from the object and having its concave surface faced toward the object.

The third lens group G3 is comprised of a lens piece L8 the closest to the object and having its opposite sides shaped in aspherical convex surface, a negative power lens piece L9 having its concave surface faced toward the image plane, a cemented lens of two lens pieces, namely, a lens piece L10 having its aspherical surface faced toward the object and its opposite sides shaped in convex surface and a negative power meniscus lens piece L11 having its concave surface faced toward the object, and another cemented lens of two lens pieces, namely, a negative power meniscus lens piece L12 having its concave surface faced toward the image plane and a lens piece L13 having its opposite sides shaped in convex surface.

The fourth lens group G4 is comprised of a cemented lens of two lens pieces, namely, a lens piece L14 closer to the object and having its opposite sides shaped in convex surface and a lens piece L15 having its opposite sides shaped in concave surface.

The fifth lens group G5 is comprised of a negative power meniscus lens piece L16 having its concave surface faced toward the image plane.

The sixth lens group G6 is comprised of a positive power meniscus lens piece L17 having its convex surface faced toward the image plane.

The zoom lens in the second embodiment, upon varying its operative posture from the wide angle end to the telephoto end to vary magnification, has its first lens group displaced toward the object, its second lens group traversed along the trajectory first coming closer to and then apart from the image plane, its third lens group displaced toward the object, its fourth lens group traversed relative to the third lens group along the trajectory first coming closer to and then apart from the image plane, its fifth lens group displaced toward the object, and its sixth lens group kept stationary relative to the image plane.

Focusing on an object within close-up photographing range is conducted by displacing the fourth lens group toward the image plane.

The optical data of parameters on the zoom lens in the second embodiment are given as follows:

TABLE 4

| NS | R | D | Nd | vd |
|---|---|---|---|---|
| 1 | 71.8184 | 1.3000 | 1.91048 | 31.31 |
| 2 | 38.1169 | 0.0100 | 1.57046 | 42.84 |
| 3 | 38.1169 | 4.5000 | 1.49845 | 81.61 |
| 4 | -271.5053 | 0.2000 | | |
| 5 | 34.2543 | 3.5128 | 1.62032 | 63.39 |
| 6 | 144.7606 | D(6) | | |
| 7 ASPH | 51.0704 | 0.2000 | 1.51700 | 49.96 |
| 8 | 43.5620 | 0.7600 | 1.91695 | 35.25 |

TABLE 4-continued

| NS | R | D | Nd | vd |
|---|---|---|---|---|
| 9 | 9.1890 | 3.7360 | | |
| 10 | −21.5757 | 0.6040 | 1.91695 | 35.25 |
| 11 | 29.1538 | 0.4000 | | |
| 12 | 20.4299 | 2.7524 | 1.93323 | 20.88 |
| 13 | −21.6790 | 0.7155 | | |
| 14 | −12.4871 | 0.5960 | 1.77621 | 49.62 |
| 15 | −39.8843 | D(15) | | |
| 16 STOP | 0.0000 | 1.2000 | | |
| 17 ASPH | 10.5362 | 2.8018 | 1.58547 | 59.46 |
| 18 ASPH | −22.5427 | 0.2000 | | |
| 19 | 158.7690 | 0.5000 | 1.83945 | 42.72 |
| 20 | 12.7924 | 1.5947 | | |
| 21 ASPH | 43.3184 | 2.3000 | 1.58547 | 59.46 |
| 22 | −12.8698 | 0.0100 | 1.57046 | 42.84 |
| 23 | −12.8698 | 0.4670 | 1.91048 | 31.31 |
| 24 | −21.0076 | 0.8760 | | |
| 25 | 64.1680 | 0.4670 | 1.91695 | 35.25 |
| 26 | 15.3783 | 0.0100 | 1.57046 | 42.84 |
| 27 | 15.3783 | 3.0765 | 1.62032 | 63.39 |
| 28 | −13.0505 | D(28) | | |
| 29 | 41.5408 | 1.3000 | 1.81263 | 25.46 |
| 30 | −58.6162 | 0.0100 | 1.57046 | 42.84 |
| 31 | −58.6162 | 0.4830 | 1.80831 | 46.50 |
| 32 | 12.0837 | D(32) | | |
| 33 | −15.2307 | 0.6300 | 1.81263 | 25.46 |
| 34 | −23.6034 | D(34) | | |
| 35 | −87.2068 | 1.9569 | 1.73234 | 54.67 |
| 36 | −27.2049 | 9.8000 | | |
| 37 | 0.0000 | 2.8000 | 1.51872 | 64.20 |

The optical data of parameters of the aspherical surfaces are given as follows:

TABLE 5

| ASPH | ε | A4 | A6 | A8 | A10 |
|---|---|---|---|---|---|
| 7 | 1.0000 | 2.99229e−005 | −2.77911e−007 | 4.08113e−009 | −6.45590e−012 |
| 17 | 1.0000 | −9.24021e−005 | −2.03212e−006 | 1.09833e−007 | −3.07901e−009 |
| 18 | 1.0000 | 2.42296e−004 | −3.20842e−006 | 1.17483e−007 | −3.05003e−009 |
| 21 | 1.0000 | −1.20912e−005 | −1.01954e−006 | 2.87946e−008 | −2.68033e−010 |

Further given below is a varied distance between the specified adjacent pairs of the surfaces of the lens pieces during the zooming in its various stages, that is, with the zoom lens staying at the wide-angle end (f=11.22 mm) being extended to the intermediate focal distance (f=63.64 mm) and up to the telephoto end (f=145.52), and vice versa, together with a focal distance f (in millimeters). F number Fno, and an angle of field ω.

TABLE 6

| f | 11.22 | 63.64 | 145.52 |
|---|---|---|---|
| Fno | 3.6414 | 5.3644 | 5.7509 |
| ω | 37.997 | 9.208 | 3.170 |
| D(6) | 0.9300 | 21.8749 | 36.7527 |
| D(15) | 18.6221 | 4.8769 | 1.4250 |
| D(28) | 1.1900 | 4.2490 | 1.0100 |
| D(32) | 8.8421 | 5.7832 | 9.0221 |
| D(34) | 0.8860 | 15.9875 | 20.1532 |

Still further given below is a varied distance between the surfaces of the lens pieces from a state where the zoom lens in focus on an object within close-up photographing range stays at the wide-angle end (f=11.22 mm) to another state of its being extended to the intermediate focal length (f=63.64 mm) and up to the telephoto end (f=145.52 mm), together with a focal length f (in millimeters) of the zoom lens in infinity focus and a distance D(0) (in millimeters) from the object to photograph to the foremost or first lens surface:

| f | 11.22 | 63.64 | 145.52 |
|---|---|---|---|
| D(0) | 918.76 | 896.55 | 880.86 |
| D(28) | 1.2267 | 4.6723 | 3.4247 |
| D(32) | 8.8054 | 5.3598 | 6.6074 |

EMBODIMENT 3

Figure 9:
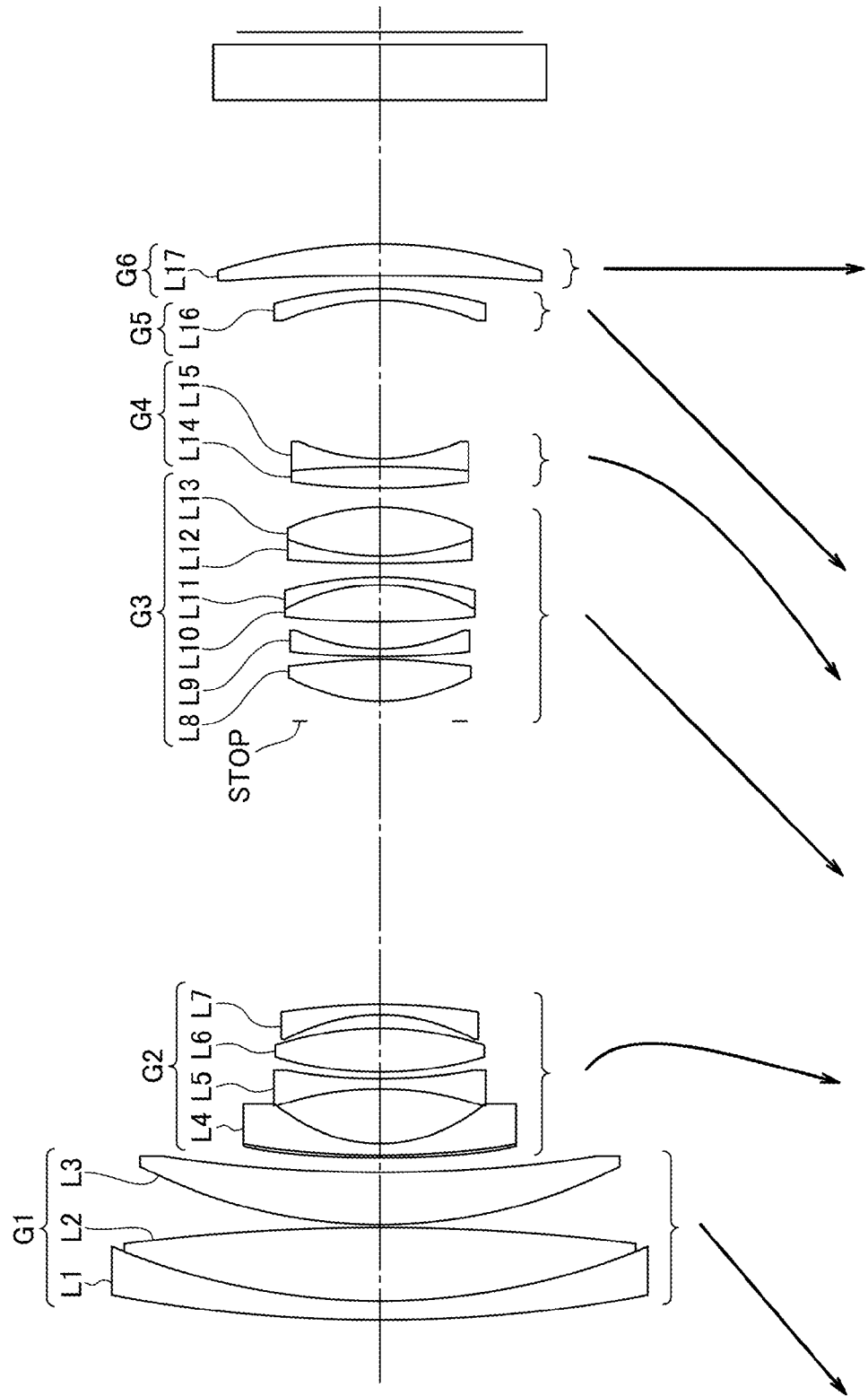
FIG. 9 is a vertical cross-sectional view illustrating a third embodiment of the zoom lens according to the present invention, with the zoom lens taking an operative posture at the wide-angle end.
Figure 10:
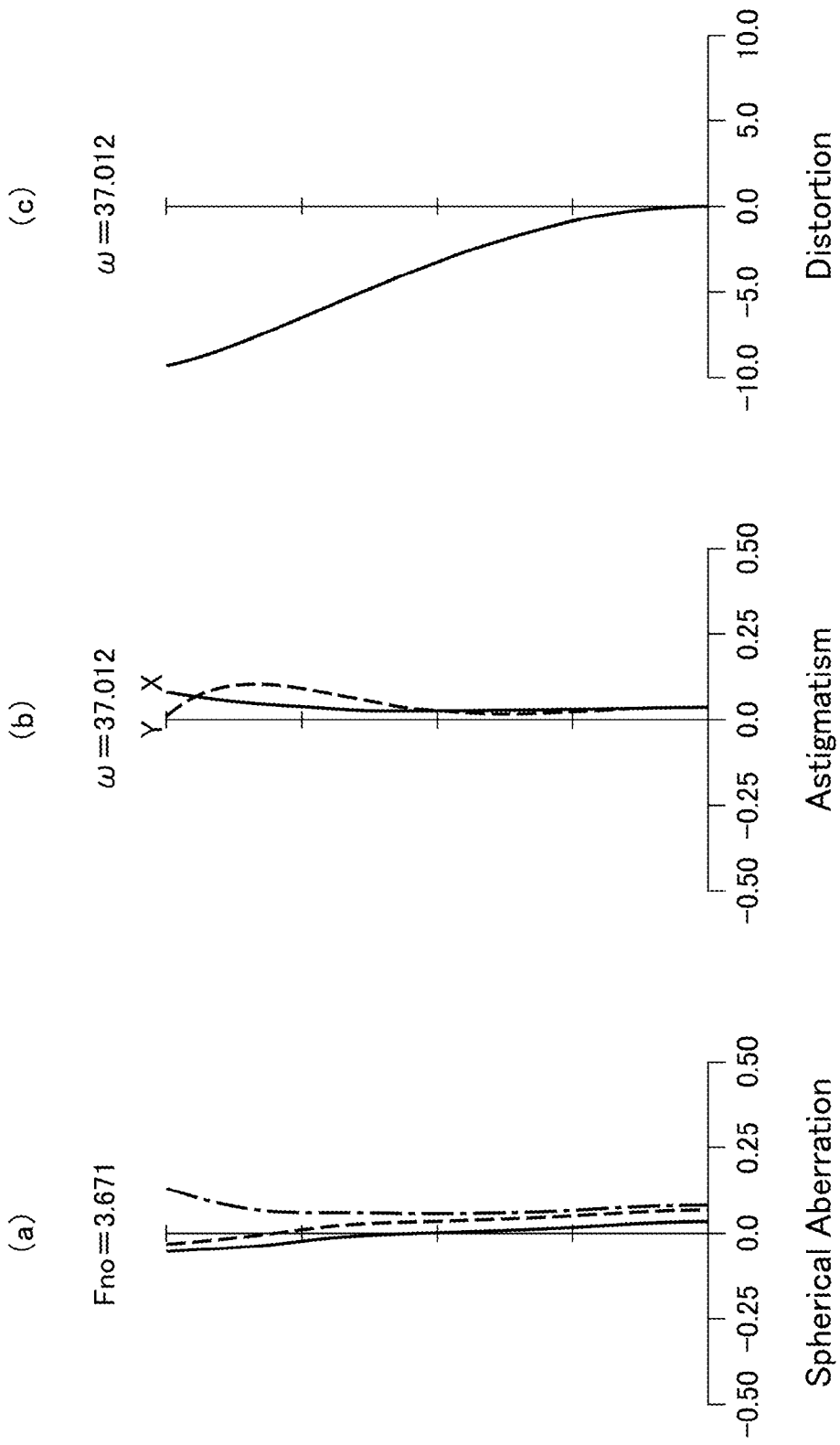
FIG. 10 depicts graphs of spherical aberration, astigmatism, and distortion developed in the third embodiment of the zoom lens photographing at the wide-angle end and in infinity focus.
Figure 11:
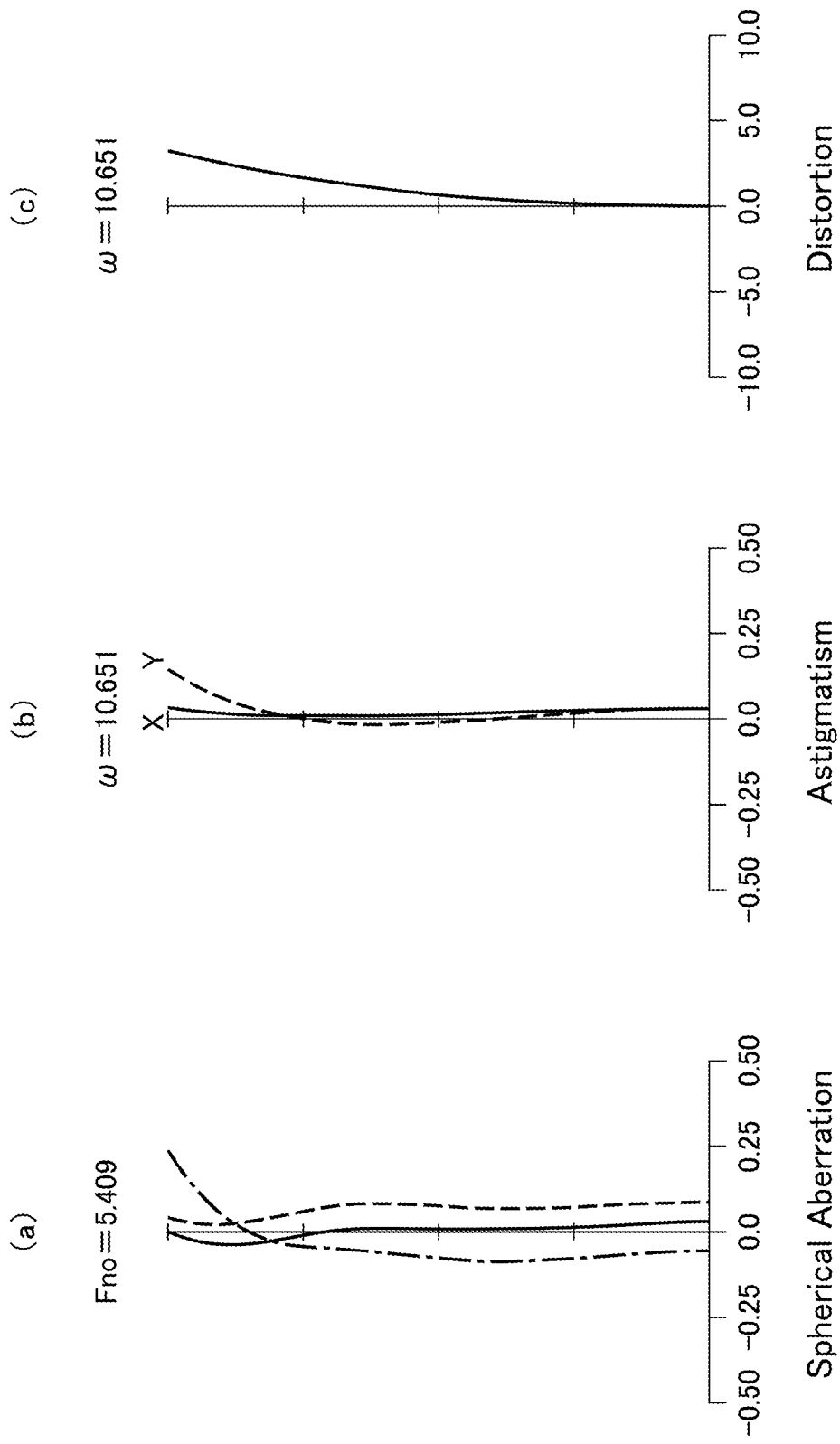
FIG. 11 depicts graphs of spherical aberration, astigmatism, and distortion developed in the third embodiment of the zoom lens extended to the intermediate focal distance and in infinity focus.
Figure 12:
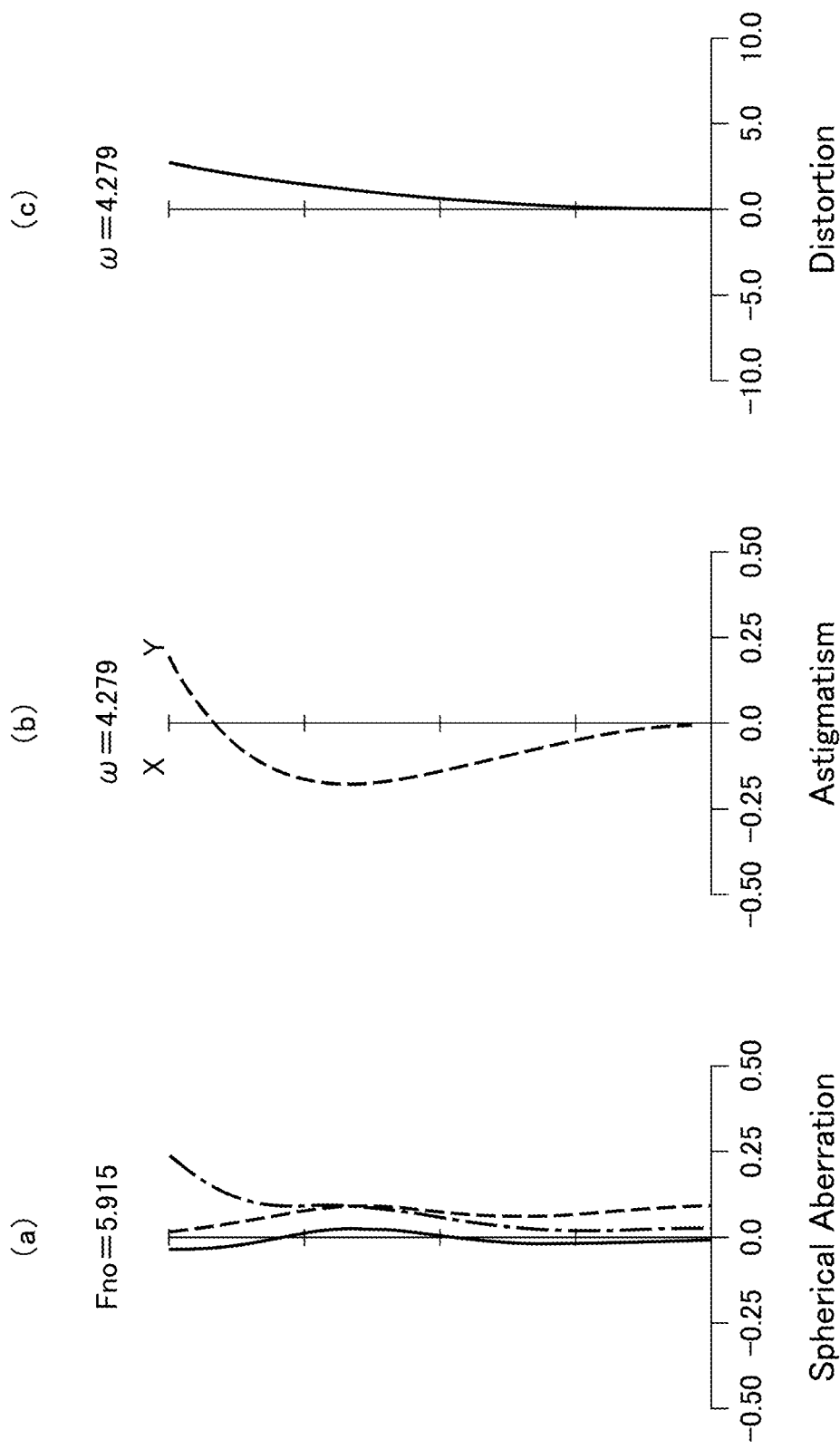
FIG. 12 depicts graphs of spherical aberration, astigmatism, and distortion developed in the third embodiment of the zoom lens extended up to the telephotographing focal distance and in infinity focus.

A third embodiment of the zoom lens comprises, as shown in FIG. 9, the first lens group G1 of positive refractive power, the second lens group G2 of negative refractive power, the third lens group G3 of positive refractive power, the fourth lens group G4 of negative refractive power, the fifth lens group G5 of negative refractive power, and the sixth lens group G6 of positive refractive power serially arranged in order on the closest to an object first basis.

The first lens group G1 is comprised of a cemented lens of two lens pieces, namely, a negative power meniscus lens piece L1 the closest to the object and having its convex surface faced toward the object and a positive power lens piece L2, and a positive power meniscus lens piece L3 having its convex surface faced toward the object.

The second lens group G2 is comprised of a negative power meniscus lens piece L4 the closest to the object and having its front side shaped in aspherical surface and its rear side shaped in intensely in-curved concave surface, a lens piece L5 the second closest to the object and having its opposite sides shaped in concave surface, a lens piece L6 having its opposite sides shaped in convex surface, and a negative power meniscus lens piece L7 the farthest from the object and having its concave surface faced toward the object.

The third lens group G3 is comprised of a lens piece L8 the closest to the object and having its opposite sides shaped in aspherical convex surface, a negative power lens piece L9 having its concave surface faced toward the image plane, a cemented lens of two lens pieces, namely, a lens piece L10 having its aspherical surface faced toward the object and its opposite sides shaped in convex surface and a negative power meniscus lens piece L1 having its concave surface faced toward the object, and another cemented lens of two lens pieces, namely; a negative power meniscus lens piece L12 having its concave surface faced toward the image plane and a lens piece L13 having its opposite sides shaped in convex surface.

The fourth lens group G4 is comprised of a cemented lens of two lens pieces, namely, a lens piece L14 closer to the object and having its opposite sides shaped in convex surface and a lens piece L15 having its opposite sides shaped in concave surface.

The fifth lens group G5 is comprised of a negative power meniscus lens piece L16 having its concave surface faced toward the image plane.

The sixth lens group G6 is comprised of a positive power meniscus lens piece L17 having its convex surface faced toward the image plane.

The zoom lens in the third embodiment, upon varying its operative posture from the wide angle end to the telephoto end to vary magnification, has its first lens group displaced toward the object, its second lens group traversed along the trajectory first coming closer to and then apart from the image plane, its third lens group displaced toward the object, its fourth lens group traversed relative to the third lens group along the trajectory first coming closer to and then apart from the image plane, its fifth lens group displaced toward the object, and its sixth lens group kept stationary relative to the image plane.

Focusing on an object within close-up photographing range is conducted by displacing the fourth lens group toward the image plane.

The optical data of parameters of the zoom lens in the third embodiment are given as follows:

TABLE 7

| NS | R | D | Nd | vd |
|---|---|---|---|---|
| 1 | 109.0553 | 1.5000 | 1.90366 | 31.31 |
| 2 | 52.5697 | 0.0100 | 1.56732 | 42.84 |
| 3 | 52.5697 | 5.5700 | 1.49700 | 81.61 |
| 4 | −146.2327 | 0.2000 | | |
| 5 | 39.5728 | 3.9700 | 1.61800 | 63.39 |
| 6 | 112.3407 | (D)6 | | |
| 7 ASPH | 79.0234 | 0.2000 | 1.51460 | 49.96 |
| 8 | 65.0676 | 0.9000 | 1.91082 | 35.25 |
| 9 | 12.3717 | 4.1854 | | |
| 10 | −23.8730 | 0.7500 | 1.91082 | 35.25 |
| 11 | 42.3962 | 0.4930 | | |
| 12 | 28.5426 | 3.3730 | 1.92286 | 20.88 |
| 13 | −24.6589 | 1.0150 | | |
| 14 | −14.8587 | 0.7500 | 1.77250 | 49.62 |
| 15 | −49.5781 | D(15) | | |
| 16 STOP | 0.0000 | 1.5000 | | |
| 17 ASPH | 13.2954 | 3.2480 | 1.58313 | 59.46 |
| 18 ASPH | −32.0948 | 0.2000 | | |
| 19 | 62.5251 | 0.6200 | 1.86188 | 42.08 |
| 20 | 15.8491 | 2.0200 | | |
| 21 ASPH | 61.7390 | 2.8500 | 1.58313 | 59.46 |
| 22 | −15.2253 | 0.0100 | 1.56732 | 42.84 |
| 23 | −15.2253 | 0.6000 | 1.90766 | 33.41 |
| 24 | −25.8791 | 1.0200 | | |
| 25 | 109.2068 | 0.5800 | 1.91082 | 35.25 |
| 26 | 20.0859 | 0.0100 | 1.56732 | 42.84 |
| 27 | 20.0859 | 3.7247 | 1.61882 | 64.32 |
| 28 | −16.2282 | D(28) | | |
| 29 | 51.3428 | 1.6830 | 1.80518 | 25.46 |
| 30 | −75.7267 | 0.0100 | 1.56732 | 42.84 |
| 31 | −75.7267 | 0.6000 | 1.80420 | 46.50 |
| 32 | 15.6073 | D(32) | | |
| 33 | −18.5559 | 0.9000 | 1.80518 | 25.46 |
| 34 | −28.5021 | D(34) | | |
| 35 | −152.2485 | 2.3543 | 1.72916 | 54.67 |
| 36 | −38.5471 | 11.0000 | | |
| 37 | 0.0000 | 4.2000 | 1.51680 | 64.20 |

The optical data of parameters on the aspherical surfaces are given as follows:

TABLE 8

| ASPH | ε | A4 | A6 | A8 | A10 |
|---|---|---|---|---|---|
| 7 | 1.0000 | 1.19556e−005 | −5.12224e−008 | 4.21707e−010 | 2.89639e−012 |
| 17 | 1.0000 | −4.81203e−005 | −6.04617e−007 | 2.40398e−008 | −4.15344e−010 |
| 18 | 1.0000 | 1.17843e−004 | −9.32847e−007 | 2.61092e−008 | −4.24829e−010 |
| 21 | 1.0000 | −5.75515e−006 | −1.80638e−007 | 2.44731e−009 | −5.43340e−012 |

Further given below is a varied distance between the specified adjacent pairs of the surfaces of the lens pieces during the zooming in its various stages, that is, with the zoom lens staying at the wide-angle end (f=14.43 mm) being extended to the intermediate focal distance (f=57.85 mm) and up to the telephoto end (f=145.40 mm), and vice versa, together with a focal distance f (in millimeters), F number Fno, and an angle of field ω.

TABLE 9

| f | 14.43 | 57.85 | 145.40 |
|---|---|---|---|
| Fno | 3.6708 | 5.4085 | 5.9148 |
| ω | 37.102 | 10.651 | 3.671 |
| D(6) | 1.1330 | 24.2823 | 41.7003 |
| D(15) | 21.7353 | 5.4909 | 1.7000 |
| D(28) | 1.4374 | 6.0872 | 3.6419 |
| D(32) | 12.1029 | 7.4531 | 9.8984 |
| D(34) | 1.0300 | 19.1189 | 24.8250 |

Still further given below is a varied distance between the surfaces of the lens pieces from a state where the zoom lens in focus on an object within close-up photographing range stays at the wide-angle end (f=14.43 mm) to another state of its being extended to the intermediate focal length (f=57.85 mm) and up to the telephoto end (f=145.40 mm), together with a focal length f (in millimeters) of the zoom lens in infinity focus and a distance D(0) (in millimeters) from the object to photograph to the foremost or first lens surface:

| f | 14.43 | 57.85 | 145.40 |
|---|---|---|---|
| D(0) | 901.52 | 876.67 | 857.15 |
| D(28) | 1.5087 | 6.7510 | 6.5503 |
| D(32) | 12.0316 | 6.7893 | 6.9900 |

EMBODIMENT 4

Figure 13:
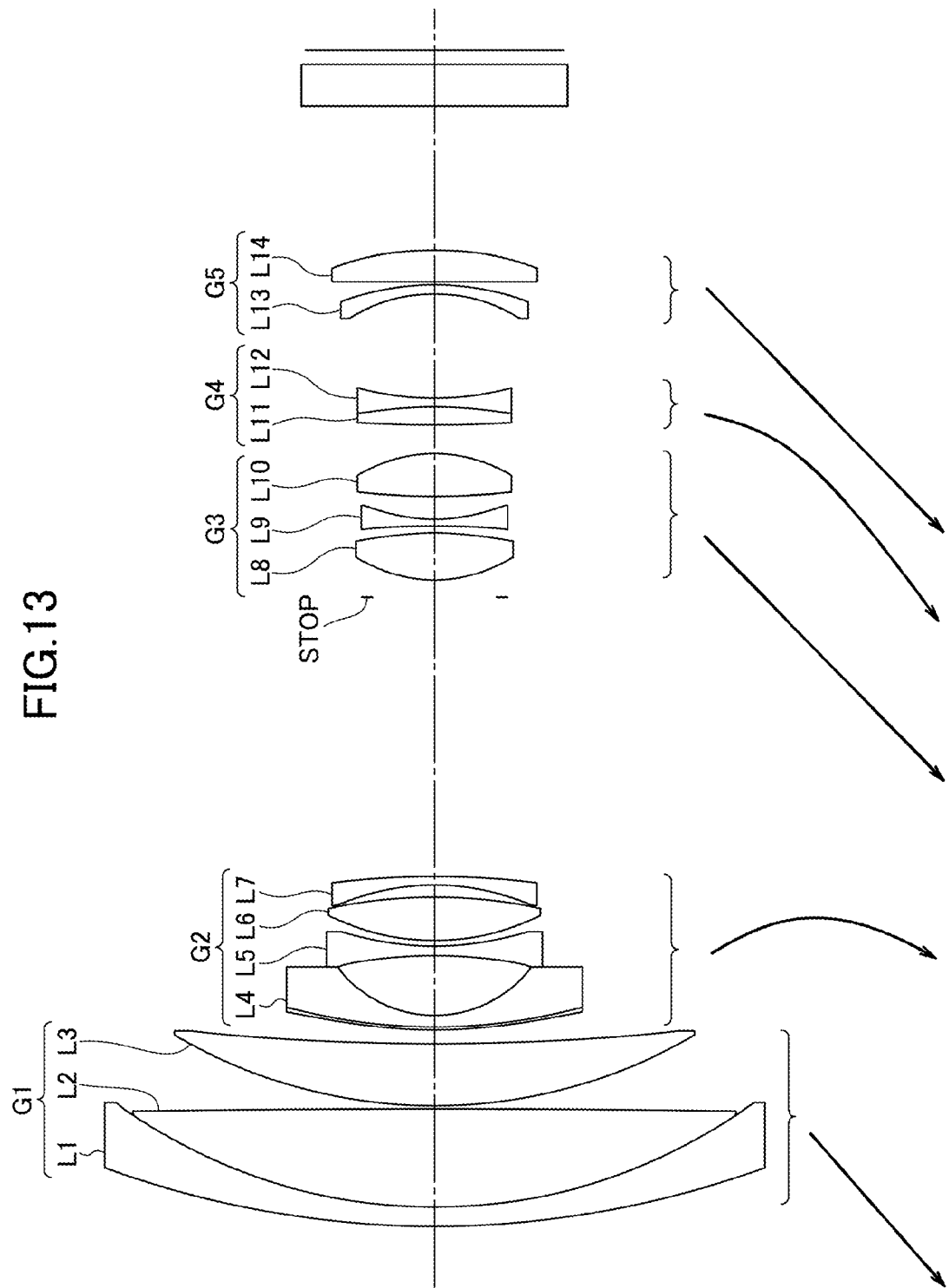
FIG. 13 is a vertical cross-sectional view illustrating a fourth embodiment of the zoom lens according to the present invention, with the zoom lens taking an operative posture at the wide-angle end.
Figure 14:
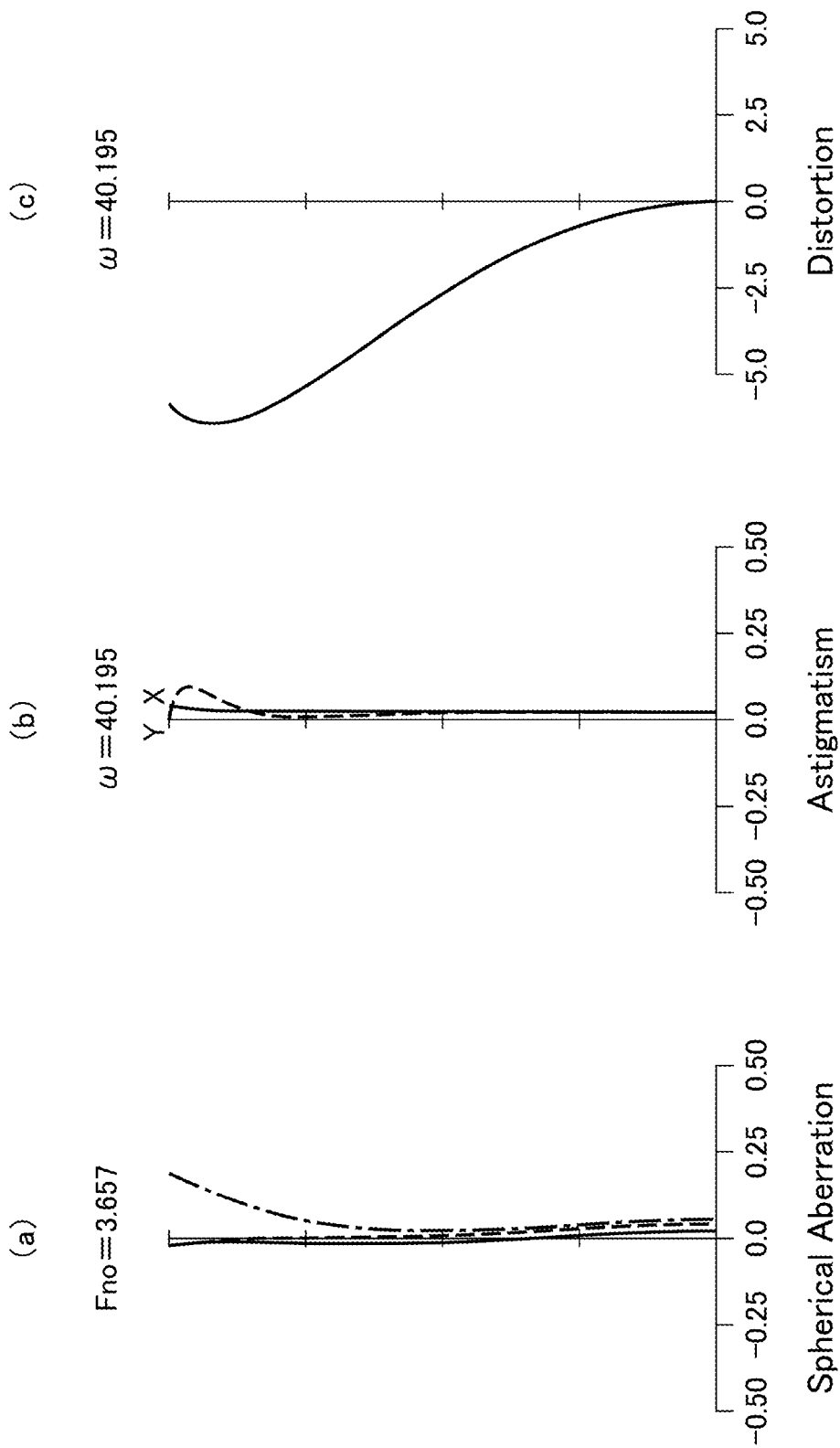
FIG. 14 depicts graphs of spherical aberration, astigmatism, and distortion developed in the fourth embodiment of the zoom lens photographing at the wide-angle end and in infinity focus.

A fourth embodiment of the zoom lens comprises, as shown in FIG. 13, the first lens group G1 of positive refractive power, the second lens group G2 of negative refractive power, the third lens group G3 of positive refractive power, the fourth lens group G4 of negative refractive power, and the fifth lens group G5 of negative refractive power serially arranged in order on the closest to an object first basis.

The first lens group G1 is comprised of a cemented lens of two lens pieces, namely, a negative power meniscus lens piece L1 the closest to the object and having its convex surface faced toward the object and a positive power lens piece L2, and a positive power meniscus lens piece L3 having its convex surface faced toward the object.

The second lens group G2 is comprised of a negative power meniscus lens piece L4 the closest to the object and having its front side shaped in aspherical and its rear side shaped in intensely in-curved concave surface, a lens piece L5 the second closest to the object and having its opposite sides shaped in concave surface, a lens piece L6 having its opposite sides shaped in convex surface, and a negative power meniscus lens piece L7 the farthest from the object and having its concave surface faced toward the object.

The third lens group G3 is comprised of a lens piece L8 the closest to the object and having its opposite sides shaped in aspherical convex surface, a lens piece L9 having its opposite sides shaped in concave surface, and a lens piece L10 having its opposite sides shaped in convex surface.

The fourth lens group G4 is comprised of a cemented lens of two lens pieces, namely a lens piece L11 closer to the object and having its opposite sides shaped in convex surface and a lens piece L12 having its opposite sides shaped in concave surface.

The fifth lens group G5 is comprised of a negative power meniscus lens piece L13 having its concave surface faced toward the image plane, and a positive power meniscus lens piece L14 having its convex surface faced toward the image plane.

The zoom lens in the fourth embodiment, upon varying its operative posture from the wide angle end to the telephoto end to vary magnification, has its first lens group displaced toward the object, its second lens group traversed along the trajectory first coming closer to and then apart from the image plane, its third lens group displaced toward the object, its fourth lens group traversed relative to the third lens group along the trajectory first coming closer to and then apart from the image plane, and its fifth lens group displaced toward the object.

Focusing on an object within close-up photographing range is conducted by displacing the fourth lens group toward the image plane.

The optical data of parameters of the zoom lens in the fourth embodiment are given as follows:

TABLE 10

| NS | R | D | Nd | vd |
|---|---|---|---|---|
| 1 | 64.9819 | 1.3000 | 1.90366 | 31.31 |
| 2 | 36.3975 | 0.0100 | 1.56732 | 42.84 |
| 3 | 36.3975 | 6.6600 | 1.49700 | 81.61 |
| 4 | −1186.1757 | 0.2000 | | |
| 5 | 34.2934 | 4.2232 | 1.61800 | 63.39 |
| 6 | 162.5347 | D(6) | | |
| 7 ASPH | 33.6698 | 0.2000 | 1.51460 | 49.96 |
| 8 | 36.8067 | 0.8000 | 1.91082 | 35.25 |
| 9 | 8.1262 | 4.0531 | | |
| 10 | −29.8667 | 0.6500 | 1.91082 | 35.25 |
| 11 | 20.0064 | 0.4000 | | |
| 12 | 15.8824 | 2.9802 | 1.92286 | 20.88 |
| 13 | −31.7119 | 0.7663 | | |
| 14 | −16.6818 | 0.6000 | 1.77250 | 49.62 |
| 15 | −54.0405 | D(15) | | |
| 16 STOP | 0.0000 | 1.2000 | | |
| 17 ASPH | 9.0025 | 3.2330 | 1.58313 | 59.46 |
| 18 ASPH | −17.0238 | 0.4600 | | |
| 19 | −52.2330 | 0.5000 | 1.90366 | 31.31 |
| 20 | 12.6447 | 1.5345 | | |
| 21 | 46.2818 | 2.9182 | 1.59282 | 68.62 |
| 22 | −9.5695 | D(22) | | |
| 23 | 100.3805 | 1.2000 | 1.80518 | 25.46 |
| 24 | −28.6956 | 0.0100 | 1.56732 | 42.84 |
| 25 | −28.6956 | 0.6000 | 1.80139 | 45.45 |
| 26 ASPH | 19.7020 | D(26) | | |
| 27 | −10.7494 | 0.6300 | 1.80518 | 25.46 |
| 28 | −17.3803 | 0.2000 | | |
| 29 | −4854.1028 | 2.1691 | 1.48749 | 70.44 |
| 30 | −20.5041 | D(30) | | |
| 31 | 0.0000 | 9.8000 | | |
| 32 | 0.0000 | 2.8000 | 1.51680 | 64.20 |

The optical data of parameters on the aspherical surfaces are given as follows:

TABLE 11

| ASPH | ϵ | A4 | A6 | A8 | A10 |
|---|---|---|---|---|---|
| 7 | 1.0000 | −1.81150e−006 | −3.53409e−007 | 2.30973e−009 | −1.22024e−011 |
| 17 | 1.0000 | −1.28660e−004 | 1.17974e−006 | −4.72888e−008 | −2.76128e−009 |
| 18 | 1.0000 | 4.39407e−004 | 1.33550e−006 | −1.82741e−007 | 0.00000e+000 |
| 26 | 1.0000 | −2.01216e−005 | −1.13690e−006 | 1.04261e−007 | −2.22909e−009 |

Further given below is a varied distance between the specified adjacent pairs of the surfaces of the lens pieces during the zooming in its various stages, that is, with the zoom lens staying at the wide-angle end (f=10.31 mm) being extended to the intermediate focal distance (f=41.50 mm) and up to the telephoto end (f=100.60 mm), and vice versa, together with a focal distance f (in millimeters), F number Fno, and an angle of field ω.

TABLE 12

| f | 10.31 | 41.50 | 100.60 |
|---|---|---|---|
| Fno | 3.657 | 5.267 | 5.799 |
| ω | 40.1947 | 10.9138 | 4.5726 |
| D(6) | 0.9310 | 19.9590 | 33.2042 |
| D(15) | 19.0512 | 4.6009 | 1.6230 |
| D(22) | 1.9788 | 3.7822 | 0.5120 |
| D(26) | 7.0763 | 5.2729 | 8.5431 |
| D(30) | 0.0000 | 13.7884 | 20.1450 |

Still further given below is a varied distance between the surfaces of the lens pieces from a state where the zoom lens in focus on an object within close-up photographing range stays at the wide-angle end (f=10.31 mm) to another state of its being extended to the intermediate focal length (f=41.50 mm) and up to the telephoto end (f=100.60 mm), together with a focal length f (in millimeters) of the zoom lens in infinity focus and a distance D(0) (in millimeters) from the object to photograph to the foremost or first lens surface:

| f | 10.31 | 41.50 | 100.60 |
|---|---|---|---|
| D(0) | 919.86 | 901.49 | 884.90 |
| D(22) | 2.0430 | 4.3047 | 9.5769 |
| D(26) | 7.0121 | 4.7504 | 6.4782 |

For each of the embodiments described so far, the values to substitute for the terms in the formulae are given as follows:

TABLE 13

| | Embodiment 1 | Embodiment 2 | Embodiment 3 | Embodiment 4 |
|---|---|---|---|---|
| βrt | 2.911 | 3.162 | 2.999 | 2.502 |
| frt/ft | −0.391 | −0.460 | −0.503 | −3.020 |
| β2t/β2w | 4.540 | 6.759 | 4.488 | 4.414 |
| frw/f2 | 2.335 | 2.760 | 2.848 | 3.326 |

DESCRIPTION OF THE ALPHANUMERIC REFERENCE SYMBOLS

| STOP | Aperture Stop |
|------|---------------|
| G1 | 1st Lens Group |
| G2 | 2nd Lens Group |
| G3 | 3rd Lens Group |
| G4 | 4th Lens Group |
| G5 | 5th Lens Group |
| G6 | 6th Lens Group |

The invention claimed is:

1. A zoom lens comprising at least five lens groups, namely, the first lens group of positive refractive power, the second lens group of negative refractive power, the third lens group of positive refractive power, the fourth lens group, and the fifth lens group serially arranged in order on the closest to an object first basis, meeting the requirements defined in the formulae as follows:

$$2.0 < \beta rt < 3.5 \tag{1}$$

$$-0.8 < frt/ft < -0.3 \tag{2}$$

where βrt is a composite lateral magnification of all of the lens groups behind the third lens group and closer to the image plane than the same while the zoom lens takes an operative posture at its telephoto end, frt is a composite focal length of all of the lens groups behind the third lens group and closer to the image plane while the zoom lens takes an operative posture at its telephoto end, and ft is a focal length of the zoom lens at the telephoto end.

2. The zoom lens according to claim 1, wherein the second lens group meets the requirements defined in the formula as follows:

$$3.5 < \beta 2t/\beta 2w < 8.0 \tag{3}$$

where β2t is a lateral magnification of the second lens group in the zoom lens focusing telephoto, and β2w is a lateral magnification of the second lens group in the zoom lens focusing wide angle.

3. The zoom lens according to claim 1, wherein, upon shifting its operative posture from the wide-angle end to the telephoto end to vary magnification, the zoom lens has its first lens group displaced towards an object.

4. The zoom lens according to claim 1, wherein the fourth lens group exhibits negative refractive power.

5. The zoom lens according to claim 1, wherein the fourth lens group is displaced toward the image plane for shifting the zoom lens from a state of being in infinity focus to another state of being in focus on an object within close-up photographing range.

6. The zoom lens according to claim 1, wherein the lens groups behind the third lens group and closer to the image plane than the same meet the requirements defined in the formula as follows:

$$2.2 < frw/f2 < 3.4 \tag{4}$$

where frw is a composite focal length of the lens groups behind the third lens group and closer to the image plane, and f2 is a focal length of the second lens group.

7. The zoom lens according to claim 1, wherein the fifth lens group exhibits negative refractive power.

8. The zoom lens according to claim 1, wherein a sixth lens group of positive refractive power is disposed immediately behind the fifth lens group and closer to the image plane.

9. A camera device incorporating image pick-up devices in position closer to the image plane of the zoom lens according to claim 1, for receiving an optical image produced by the zoom lens and converting it into electric signals.

* * * * *